(12) United States Patent
Sueoka et al.

(10) Patent No.: US 8,316,699 B2
(45) Date of Patent: Nov. 27, 2012

(54) METHOD AND DEVICE FOR MEASURING AND ADJUSTING VALVE CLEARANCE

(75) Inventors: Hisayuki Sueoka, Tokyo (JP); Yasuyoshi Miyauchi, Tokyo (JP); Yasuo Morise, Tokyo (JP); Tatsumi Otomura, Tokyo (JP); Hiroya Mitsushima, Tokyo (JP)

(73) Assignee: Hirata Corporation, Tokyo (JP)

( * ) Notice: Subject to any disclaimer, the term of this patent is extended or adjusted under 35 U.S.C. 154(b) by 81 days.

(21) Appl. No.: 13/062,315

(22) PCT Filed: Mar. 23, 2009

(86) PCT No.: PCT/JP2009/055539
§ 371 (c)(1),
(2), (4) Date: Apr. 1, 2011

(87) PCT Pub. No.: WO2010/026797
PCT Pub. Date: Mar. 11, 2010

(65) Prior Publication Data
US 2011/0174254 A1    Jul. 21, 2011

(30) Foreign Application Priority Data
Sep. 8, 2008  (JP) ................................. 2008-229205

(51) Int. Cl.
*G01M 15/00* (2006.01)
(52) U.S. Cl. ................... 73/114.79; 73/114.77
(58) Field of Classification Search ............... 73/114.77, 73/114.79
See application file for complete search history.

(56) References Cited

U.S. PATENT DOCUMENTS

| | | | | |
|---|---|---|---|---|
| 4,471,531 A | * | 9/1984 | Gunderson | 33/657 |
| 6,647,770 B2 | * | 11/2003 | Satish et al. | 73/114.79 |
| 6,722,331 B2 | * | 4/2004 | Koehler et al. | 123/90.45 |
| 7,104,121 B2 | * | 9/2006 | Firmin et al. | 73/114.79 |
| 7,114,230 B2 | * | 10/2006 | Batchelor et al. | 29/407.05 |
| 7,121,525 B2 | * | 10/2006 | Gelez | 251/129.19 |
| 2005/0205035 A1 | * | 9/2005 | Hathaway et al. | 123/90.52 |
| 2011/0185569 A1 | * | 8/2011 | Sueoka et al. | 29/888.011 |
| 2011/0264403 A1 | * | 10/2011 | Sueoka et al. | 702/150 |

FOREIGN PATENT DOCUMENTS

| | | |
|---|---|---|
| JP | 50-97355 | 8/1975 |
| JP | 63-196801 | 8/1988 |
| JP | 63-266105 | 11/1988 |
| JP | 2008-180216 | 8/2008 |

* cited by examiner

*Primary Examiner* — Freddie Kirkland, III
(74) *Attorney, Agent, or Firm* — Bacon & Thomas, PLLC

(57) ABSTRACT

The present invention provides a method and a device for accurately measuring and adjusting a valve clearance value to a desired value in an engine having a rocker-arm-type valve. According to a valve clearance measuring and adjusting method of the present invention, a pair of probes 60 each having a round tip end 611 are brought into direct contact with a valve clearance CV of an engine having a rocker-arm-type valve 105, and a center-to-center distance between the two tip ends 611 is measured. An actual valve clearance value is calculated and measured on the basis of the center-to-center distance between the tip ends 611. The actual valve clearance value is adjusted to a desired valve clearance value, while the actual valve clearance value is measured in real time.

16 Claims, 14 Drawing Sheets

METHOD AND DEVICE FOR MEASURING AND ADJUSTING VALVE CLEARANCE

TECHNICAL FIELD

The present invention relates to a method and a device for measuring and adjusting a valve clearance provided in an internal combustion engine for absorbing changes caused by thermal expansion.

BACKGROUND ART

An internal combustion engine, in particular, an automotive engine, has intake and exhaust valves for intake of air-fuel mixture and exhaust. At the time of intake and exhaust, the intake and exhaust valves are opened and closed. A cam shaft controls the opening and closing of the intake and exhaust valves.

Types of operation of opening the intake and exhaust valves by cams of the cam shaft are classified into a direct acting type in which cams directly press valve lifters for opening and closing valves, and a rocker arm type in which cams press valves via arms called rocker arms for opening and closing valves.

The intake and exhaust valves thermally expand because of heat from combustion chambers. When the valves thermally expand, intake and exhaust timings change accordingly. Thus, in order to absorb such a change caused by thermal expansion, in a condition in which a cam does not press a valve lifter or a cam shaft abutment portion (a roller or a slipper surface) of a rocker arm, a clearance (valve clearance) is provided for adjustment between the cam and the valve lifter (or the cam shaft abutment portion of the rocker arm).

In assembly of an engine, usually, after assembly of the valves to a cylinder head, corresponding valve clearances are automatically adjusted by a valve clearance adjusting apparatus. Subsequent to the adjustment, the valve clearances are actually measured for confirmation.

An example of a valve clearance adjusting method is disclosed in, for example, Patent Document 1. In this valve clearance adjustment method, an adjust screw of a rocker arm is rotated in the normal direction so as to press a valve by a rocker arm by a displacement amount greater than a valve clearance. After that, the adjust screw is rotated in the reverse direction to as to return the valve to an ordinal home position. A point in time at which the valve stops its displacement after having returned to the home position is detected by displacement stoppage detection means, and the position of the rocker arm at that time is recognized as a zero point position at which the clearance is zero. After that, the adjust screw is rotated in the same reverse direction by a predetermined angle so as to set a valve clearance, and then locked by a lock nut such that the adjust screw becomes non-rotatable. The term "valve clearance" used herein refers to a clearance between a valve-side end portion of a rocker arm and a top portion of a bridge member which connects valve retainers of left and right valves.

An example of a valve clearance adjusting device is disclosed in, for example, Patent Document 2. This valve clearance adjusting device is configured to set a valve clearance between an adjust screw and a valve in an actual machine in which a cylinder head and a cylinder block have been assembled. An adjustment head for adjusting valve clearance is provided to be movable in the vertical direction along guide rails, and is moved up and down over a predetermined stroke by means of an elevating actuator such as a cylinder.

Furthermore, a roller rocker arm (rocker arm of a fulcrum adjustment type) which does not include a rocker shaft is described in Patent Document 3.

PRIOR ART DOCUMENTS

Patent Document 1: Japanese Patent Application Laid-Open (kokai) No. 2004-245111
Patent Document 2: Japanese Patent No. 2830715
Patent Document 3: Japanese Patent Application Laid-Open (kokai) No. H5-65810

DISCLOSURE OF THE INVENTION

Problems to be Solved by the Invention

Incidentally, in the case of conventional method and apparatus for adjusting valve clearances as described in Patent Documents 1 to 3, a valve clearance at a certain location (a valve clearance location) is adjusted while the valve clearance value is estimated, and the actual valve clearance value is not measured. After this adjustment, worker manually measures and confirms the valve clearance value; specifically, he/she inserts a clearance gauge called a shim into the clearance at the valve clearance location.

However, in the case of the conventional valve clearance adjusting method and apparatus, the valve clearance value is adjusted on the basis of an estimated value thereof. Therefore, difficulty is encountered in preventing occurrence of variation in accuracy.

Furthermore, since the work for measuring and confirming the valve clearance value is manually performed by a worker, variation arises in measurement values because of, for example, difference in the level of skill among workers. In addition, when an unskilled worker performs measurement, a tact time (work time) increases.

The present invention has been conceived in view of the above circumstances, and an object of the invention is to provide a method and a device for accurately measuring and adjusting a valve clearance to a desired value in an engine having a rocker-arm-type valve.

Means for Solving the Problems

To achieve the above object, an invention according to claim 1 is a valve clearance measuring and adjusting method for a cylinder head which includes a valve assembled to a cylinder head main body, a rocker arm which is connected at one end to an end of the valve, and a cam shaft which comes into contact with a cam shaft abutment portion of the rocker arm having an arcuate surface so as to open and close the valve, the rocker arm including an adjust screw for adjusting a valve clearance between the cam shaft abutment portion and the cam shaft, the method being characterized by comprising a step of bringing a pair of probes each having a round tip end slightly larger than the valve clearance into direct contact with the cam shaft abutment portion and the cam shaft and measuring a center-to-center distance between the two tip ends; a calculating step of calculating and measuring an actual valve clearance value on the basis of the center-to-center distance between the tip ends; and an adjusting step of rotating the adjust screw in an arbitrary direction, while measuring the actual valve clearance value in real time, to thereby adjust the actual valve clearance value to a desired valve clearance value.

An invention according to claim 2 is a valve clearance measuring and adjusting method according to claim 1, wherein, in the calculating step, on the basis of a predetermined relationship between the center-to-center distance between the tip ends and the actual valve clearance value, a measured value of the center-to-center distance between the tip ends is converted to the valve clearance value.

An invention according to claim 3 is a valve clearance measuring and adjusting method according to claim 1, wherein the adjusting step includes rotating the adjust screw in a fastening direction, while measuring the actual valve clearance value in real time, in a state in which the actual valve clearance value is set to be larger than the desired valve clearance value; and controlling rotation of the adjust screw such that the actual valve clearance value becomes equal to the desired valve clearance value.

Inventions according to claims 4 to 6 are valve clearance measuring and adjusting methods according to claim 3, wherein radii r1 and r2 of the circular surfaces of the cam shaft and the cam shaft abutment portion, respectively, and a radius e of the tip ends are predetermined; and, when 2Y represents the center-to-center distance between the tip ends, and d1, d2, d3 represents the clearance value, on the basis of the center-to-center distance 2Y between the tip ends, the clearance value d1, d2, d3 is obtained by an expression.

An invention according to claim 7 is a valve clearance measuring and adjusting device for a cylinder head which includes a valve assembled to a cylinder head main body, a rocker arm which is connected at one end to an end of the valve, and a cam shaft which comes into contact with a cam shaft abutment portion of the rocker arm having an arcuate surface so as to open and close the valve, the rocker arm including an adjust screw for adjusting a valve clearance between the cam shaft and the cam shaft abutment portion, the device being characterized by comprising a pair of probes adapted to be brought into direct contact with the cam shaft and the cam shaft abutment portion, and having respective round tip ends slightly larger than the valve clearance; moving means for moving the pair of probes to a position of the valve clearance; drive means connected to the pair of probes and adapted to open and close the probes; measuring means for measuring a center-to-center distance between the tip ends of the pair of probes; calculating means for calculating an actual valve clearance value on the basis of a measured center-to-center distance between the tip ends; a valve clearance adjusting unit which is provided such that it can move toward and away from the adjust screw, and which rotates the adjust screw in an arbitrary direction on the basis of the actual valve clearance value measured by the measuring means, to thereby adjust the actual valve clearance value to a desired valve clearance value.

An invention according to claim 8 is a valve clearance measuring and adjusting device according to claim 7, wherein the pair of probes is held by an arch bracket, and the moving means which can move vertically is connected to the bracket.

An invention according to claim 9 is a valve clearance measuring and adjusting device according to claim 8, wherein the drive means comprises a linear motion guide held by the bracket and supporting the pair of probes in such a manner as to allow opening and closing of the pair of probes; a tension spring held by the bracket, provided in parallel with the linear motion guide, and adapted to close the pair of probes; and a slide mechanism held by the moving means and adapted to open the pair of probes.

An invention according to claim 10 is a valve clearance measuring and adjusting device according to claim 9, wherein the slide mechanism comprises an actuator provided unitarily with the moving means and adapted to provide vertically rectilinear driving, and a rectilinear cam connected to the actuator and having a taper surface formed at a tip end thereof; and rollers are provided at facing inner side surfaces, respectively, of the pair of probes in such a manner as to be rollable along the taper surface of the rectilinear cam.

An invention according to claim 11 is a valve clearance measuring and adjusting device according to claim 8, wherein the bracket has through holes extending therethrough in a vertical direction; pins are inserted through the respective through holes via respective compression springs urging the bracket upward in the vertical direction; the moving means which can move in the vertical direction are connected to projecting portions of the pins; and the bracket is floatably supported by the pins.

An invention according to claim 12 is a valve clearance measuring and adjusting device according to claim 7, wherein each of the tip ends assumes the form of a column having a substantially circular section, and peripheral surfaces of the substantially circular columns are brought into direct contact with the cam shaft and the cam shaft abutment portion.

An invention according to claim 13 is a valve clearance measuring and adjusting device according to claim 7, wherein the valve clearance adjusting unit comprises a nut runner section which includes at least one nut runner for rotating the adjust screw in an arbitrary direction; and a first elevating section which is connected to the nut runner section and which elevates and lowers the nut runner section in relation to the adjust screw.

An invention according to claim 14 is a valve clearance measuring and adjusting device according to claim 7, further comprising a slide apparatus for sliding the probes, the moving means, the drive means, the measuring means, and the valve clearance adjusting unit in the longitudinal direction of the cam shaft.

An invention according to claim 15 is a valve clearance measuring and adjusting device according to claim 7, further comprising a tilt apparatus for tilting the probes, the moving means, the drive means, the measuring means, and the valve clearance adjusting unit about a predetermined point in a plane perpendicular to the longitudinal direction of the cam shaft.

An invention according to claim 16 is a valve clearance measuring and adjusting device according to claim 7, the calculating means includes a control apparatus for controlling rotation of the adjust screw by the valve clearance adjusting unit.

Effects of the Invention

According to the present invention, the following excellent effect is achieved. In an engine having a rocker-arm-type valve, an actual valve clearance value of a valve clearance is measured directly in real time, and rotation of an adjust screw is adjusted and stopped such that the actual valve clearance value becomes equal to a desired valve clearance value. Thus, the desired valve clearance value can be obtained reliably.

BRIEF DESCRIPTION OF THE DRAWINGS

FIG. 7 A pair of views for explaining a floating mechanism of a bracket in FIG. 5, wherein FIG. 7(a) shows a condition before floating, and FIG. 7(b) shows a condition after floating.

BEST MODE FOR CARRYING OUT THE INVENTION

Embodiments of the present invention will next be described with reference to the appended drawings.

First Embodiment

Figure 1:
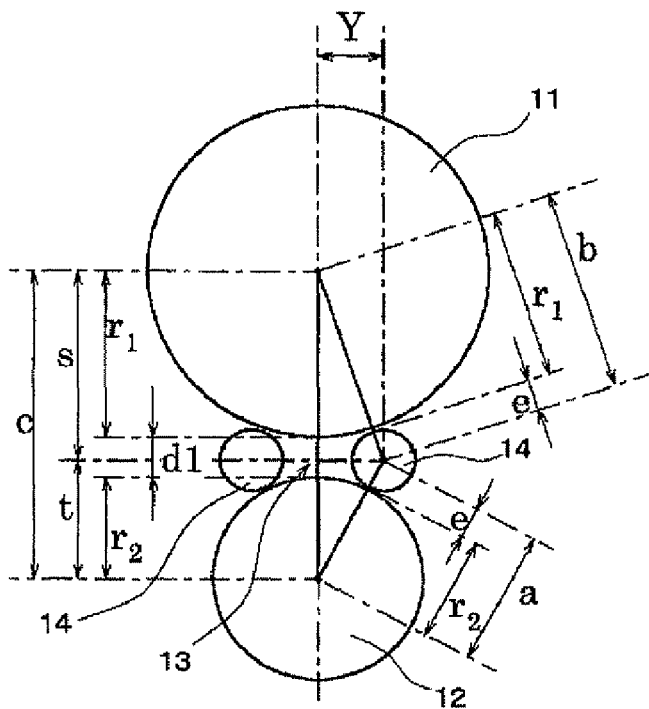
FIG. 1 Diagram for explaining a valve clearance measuring and adjusting method according to a first embodiment of the present invention.

FIG. 1 shows a diagram for explaining a valve clearance measuring and adjusting method according to a preferred embodiment of the present invention.

As shown in FIG. 1, the valve clearance measuring adjusting method according to the present embodiment is for measuring a very small clearance between facing circular surfaces; specifically, a very small valve clearance 13 between a circular surface of a cam shaft 11 and a cam shaft abutment portion 12 of a rocker arm, and for adjusting the valve clearance in real time. Herein, the cam shaft abutment portion 12 refers to a slipper surface of a rocker arm, an example of which is a roller of a roller rocker arm.

The present measuring and adjusting method includes a step (measuring step S1) of bringing a pair of probes (see probes 60 shown in FIG. 5, which will be described later) each having a round tip end 14 slightly larger than the valve clearance 13 into direct contact with the valve clearance 13 and measuring a center-to-center distance 2×Y (hereinafter, referred to as 2Y) between, the two tip ends 14; a step (calculating step S2) of calculating and measuring an actual valve clearance value d1 on the basis of the center-to-center distance 2Y between the tip ends 14; and a step (adjusting step S3) of rotating an adjust screw (see an adjust screw 106 shown in FIG. 8 which will be described later), while measuring the actual valve clearance value d1 in real time, to thereby adjust the actual valve clearance value d1 to a desired valve clearance value.

In the measuring step S1, the pair of probes having the respective tip ends 14 is caused to approach each other while following the profile of the circular surface of the cam shaft 11 until the paired probes come into contact with the valve clearance 13. Upon establishment of the contact, the center-to-center distance 2Y between the tip ends 14 is obtained.

Access of the pair of probes to the valve clearance 13 is not limited to the mode in which the probes approach each other while following the profile of the circular surface of the cam shaft 11. The pair of probes may access the valve clearance 13 from any direction convenient for contact with the valve clearance 13; specifically, access may be from above, from below, from the left, or from the right.

Meanwhile, in the calculating step S2, on the basis of a predetermined relationship between the center-to-center distance 2Y between the tip ends 14 and the valve clearance value d1 to be calculated and measured, a measured value of the center-to-center distance 2Y between the tip ends 14 is converted to the valve clearance value d1.

Specifically, the calculating step S2 is as follows. Radii r1 and r2 of the circular surfaces of the cam shaft 11 and the cam shaft abutment portion 12, respectively, and a radius e of the tip ends 14 are predetermined. A center-to-center distance between the cam shaft abutment portion 12 and the tip end 14 is represented by a; a center-to-center distance between the cam shaft 11 and the tip end 14 is represented by b; a segment corresponding to a segment of length b and extending, in a direction of extension of a center-to-center segment c between the cam shaft 11 and the cam shaft abutment portion 12 is represented by s; a segment corresponding to a segment of length a and extending in the direction of extension of the center-to-center segment c is represented by t; and a center-to-center distance between the tip ends 14 is represented by 2Y.

In this case, on the basis of the center-to-center distance 2Y between the tip ends 14, the valve clearance value d1 is obtained by Expression 1 given below.

The term "predetermined" means that, since the sizes or diameters of the cam shaft 11 and the cam shaft abutment portion 12 and the tip ends 14 of the probes to be used are predetermined, the predetermined sizes or diameters are applied.

Expression 1

When the radii r1 and r2 of the circular surfaces of the first member and the second member, respectively, and the radius e of the tip ends are predetermined, a represents a center-to-center distance between the second member and the tip end, b represents a center-to-center distance between the first member and the tip end, s represents a segment corresponding to a segment b between the center of the first member and the center of the tip end and extending in a direction of extension of a center-to-center segment c between the first member and the second member, t represents a segment corresponding to a segment a between the center of the second member and the center of the tip end and extending in the direction of extension of the center-to-center segment c, and 2Y represents a center-to-center distance between the tip ends, $$a = r2 + e \text{ and}$$

$$b = r1 + e;$$

from the Pythagorean theorem, there are obtained $$s^2 = b^2 - Y^2 \text{ and}$$

$$t^2 = a^2 - Y^2;$$

since c=s+t, there is obtained $$c = \sqrt{(b^2 - Y^2)} + \sqrt{(a^2 - Y^2)}; \text{ and}$$

since the clearance value d1 is represented by d1=c−(r1+r2), there is obtained $$d1 = \sqrt{(b^2 - Y^2)} + \sqrt{(a^2 - Y^2)} - (r1 + r2).$$

For example, with r1=15 (mm), r2=9 (mm), and e=1.5 (mm), a=10.5 (mm) and b=16.5 (mm). Therefore, when a measured value of the center-to-center distance 2Y between the tip ends (e.g., 11.970 (mm)) is obtained, the valve clearance value d1 (e.g., 0.003 (mm)) is calculated accordingly. The relationship between a measured value 2Y and the valve clearance value d1 is expressed by a linear function; thus, when the measured value 2Y is obtained, the valve clearance value d1 is uniquely determined.

In the adjusting step S3, the adjust screw is rotated in an arbitrary direction, while the actual valve clearance value d1 is measured in real time through calculation in the calculating step S2. Specifically, the actual valve clearance value d1 is adjusted by means of rotating the adjust screw in an arbitrary direction. At (or immediately before) the time when the actual valve clearance value d1 becomes equal to a desired valve clearance value, rotation of the adjust screw is stopped, whereby the valve clearance adjustment is completed.

The measuring step S1 has been described while referring to an example in which the center-to-center distance 2Y is directly measured. However, the measuring step S1 may be as follows: first, the separation distance between the tip ends 14 is measured, and then two times the radius e (2e) is added to a measured separation distance to obtain the center-to-center distance 2Y (=separation distance+2e).

Next, modifications of the valve clearance measuring and adjusting method are described.

(First Modification)

Figure 2:
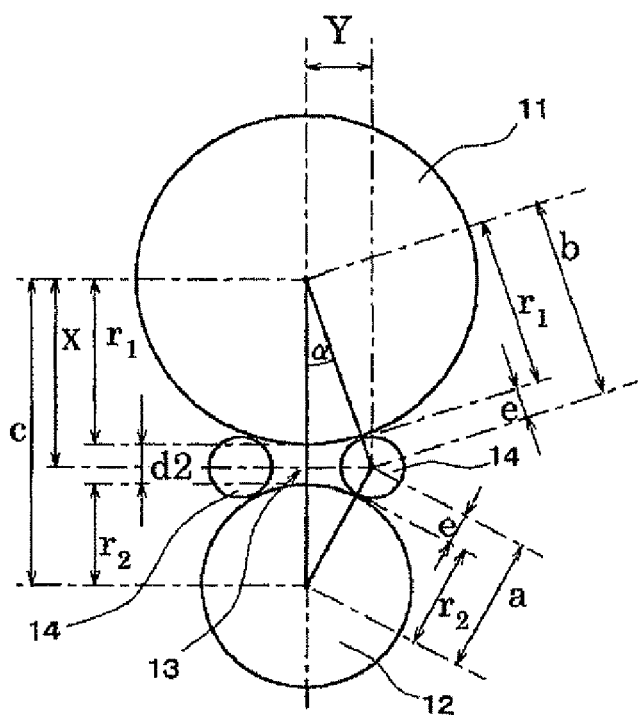
FIG. 2 Diagram showing a first modification of the measuring and adjusting method of FIG. 1.

A first modification of FIG. 1 is shown in FIG. 2. The present modification differs from the aforementioned measuring and adjusting method in a calculating process employed in the calculating step S2. The following description covers only a difference from the aforementioned method, and description of similar features is omitted.

As shown in FIG. 2, in the present modification, calculation is performed as follows. Radii r1 and r2 of the circular surfaces of the cam shaft 11 and the cam shaft abutment portion 12, respectively, a radius e of the tip ends 14, and a valve clearance value d2 are relationally predetermined. A center-to-center distance between the cam shaft abutment portion 12 and the tip end 14 is represented by a; a center-to-center distance between the cam shaft 11 and the tip end 14 is represented by b; a segment corresponding to a segment of length b and extending in a direction of extension of a center-to-center segment c is represented by X; a center-to-center distance between the tip ends 14 is represented by 2Y; and an angle between the segment of length b and the center-to-center segment c is represented by α.

In this case, on the basis of the center-to-center distance 2Y between the tip ends 14, the valve clearance value d2 is obtained by Expression 2 given below.

Expression 2

When the radii r1 and r2 of the circular surfaces of the first member and the second member, respectively, the radius e of the tip ends, and the clearance value d2 are predetermined, a represents a center-to-center distance between the second member and the tip end, b represents a center-to-center distance between the first member and the tip end, X represents a segment corresponding to a segment b between the center of the first member and the center of the tip end and extending in a direction of extension of a center-to-center segment c, 2Y represents a center-to-center distance between the tip ends, and α represents an angle between the center-to-center segment c and the segment b between the center of the first member and the center of the tip end, $$a = r2 + e \tag{1},$$

$$b = r1 + e \tag{2},$$

$$c = r1 + r2 + d2 \tag{3},$$

$$X = b \cdot \cos \alpha \tag{4}, \text{ and}$$

$$Y = b \cdot \sin \alpha \tag{5};$$

from the law of cosines $a^2 = b^2 + c^2 - 2bc \cdot \cos \alpha$, there is obtained $$\cos \alpha = \frac{(b^2 + c^2 - a^2)}{2bc}; \tag{6}$$

by assigning values (1) to (3) to Equation (6), there is obtained $$\cos \alpha \tag{6}';$$

since $\sin^2\theta + \cos^2\theta = 1$, there is obtained $$\sin \alpha = \sqrt{(1 - \cos^2 \alpha)} \tag{7};$$

by assigning value (6)' to Equation (7), there is obtained $$\sin \alpha \tag{7}';$$

by assigning values (2), (6)', and (7)' to Equations (4) and (5), X and Y are obtained; and when Y is obtained, the clearance value d2 is determined from a predetermined relationship between Y and d2.

For example, with r1=15 (mm), r2=9 (mm), and e=1.5 (mm), a=10.5 (mm), b=16.5 (mm), and c=24+d2. Thus, for individual certain valve clearance values d2, measured values of the center-to-center distance 2Y between the tip ends are obtained beforehand, thereby obtaining a relational expression which represents the relationship between the valve clearance values d2 and the measured values 2Y. Subsequently, when a certain measured value 2Y (e.g., 11.977 (mm)) is obtained, by use of the relational expression, the valve clearance value d2 is calculated (e.g., d2=0.00 (mm)). That is, the relationship between the measured value 2Y and the valve clearance value d2 is expressed by a linear function; thus, when the measured value 2Y is obtained, the valve clearance value d2 is uniquely determined.

(Second Modification)

Figure 3:
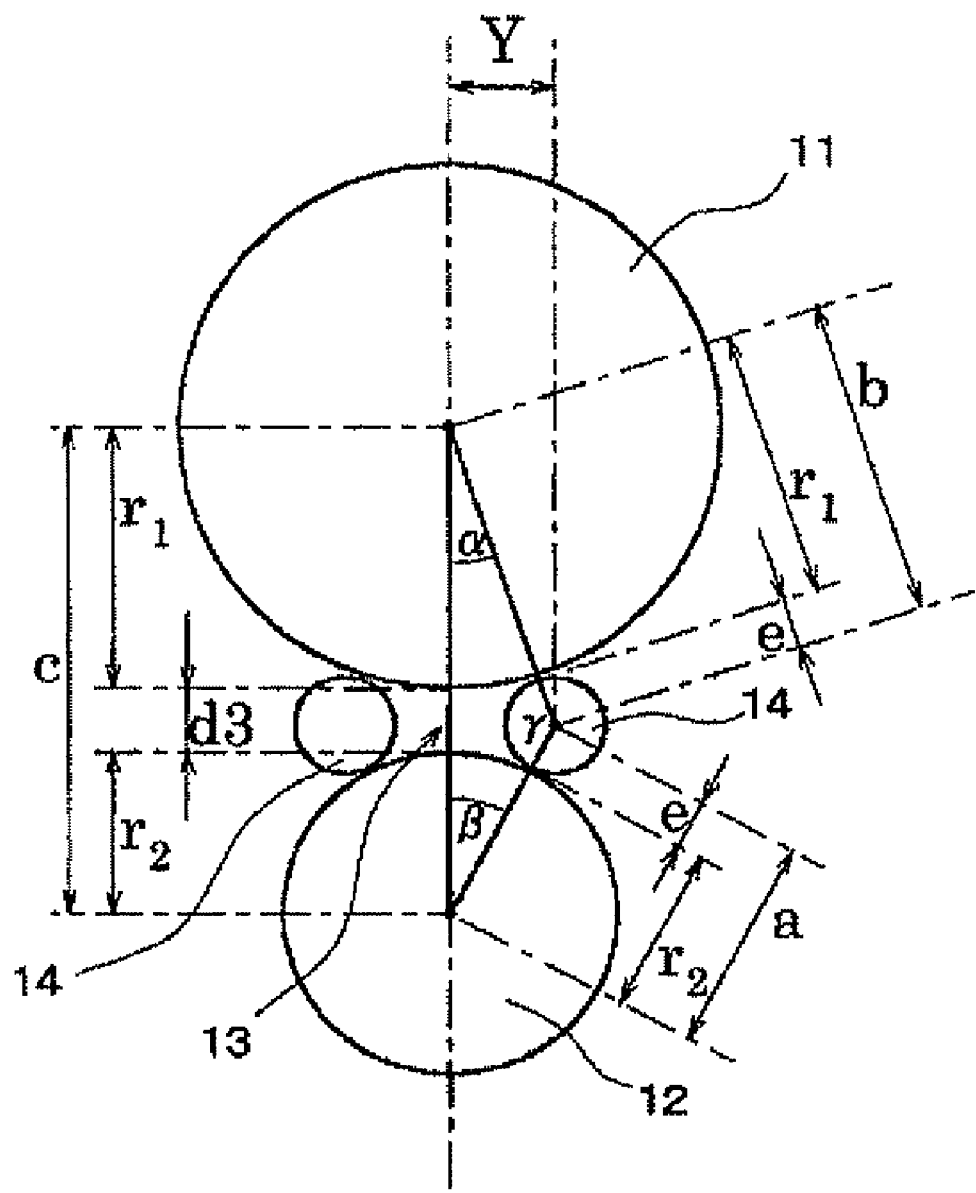
FIG. 3 Diagram showing a second modification of the measuring and adjusting method of FIG. 1.

A second modification of FIG. 1 is shown in FIG. 3. The present modification is a modification of the first modification described above.

As shown in FIG. 3, in the present modification, calculation is performed as follows. Radii r1 and r2 of the circular surfaces of the cam shaft 11 and the cam shaft abutment portion 12, respectively, a radius e of the tip ends 14, and a valve clearance value d3 are relationally predetermined. A center-to-center distance between the cam shaft abutment portion 12 and the tip end 14 is represented by a; a center-to-center distance between the cam shaft 11 and the tip end 14 is represented by b; a center-to-center distance between the tip ends 14 is represented by 2Y; an angle between a segment of length b and a center-to-center segment c is represented by α; and an angle between a segment of length a and the center-to-center segment c is represented by β.

In this case, on the basis of the center-to-center distance 2Y between the tip ends 14, the valve clearance value d3 is obtained by Expression 3 given below.

Expression 3

When the radii r1 and r2 of the circular surfaces of the first member and the second member, respectively, the radius e of the tip ends, and a clearance value d3 are relationally predetermined, a represents a center-to-center distance between the second member and the tip end, b represents a center-to-center distance between the first member and the tip end, 2Y represents a center-to-center distance between the tip ends, α represents an angle between a center-to-center segment c and a segment b between the center of the first member and the center of the tip end, and β represents an angle between the center-to-center segment c and a segment a between the center of the second member and the center of the tip end, $$a = r2 + e \quad (1),$$

$$b = r1 + e \quad (2),$$

$$c = r1 + r2 + d3 \quad (3),$$

$c = b \cdot \cos \alpha + a \cdot \cos \beta$, and $Y = b \cdot \sin \alpha = a \cdot \sin \beta$;

dividing both sides by ab gives $$\frac{Y}{ab} = \frac{\sin \alpha}{a} = \frac{\sin \beta}{b};$$

from the law of sines $$\frac{\sin \alpha}{a} = \frac{\sin \beta}{b} = \frac{\sin \gamma}{c},$$

there is obtained $$\frac{\sin \gamma}{c} = \frac{Y}{ab};$$

therefore, $$Y = \frac{ab}{c} \sin \gamma; \quad (4)$$

from the law of cosines $c^2 = a^2 - 2ab \cdot \cos \gamma$, there is obtained $$\cos \gamma = \frac{(a^2 + b^2 - c^2)}{2ab}; \quad (5)$$

by assigning values (1) to (3) to Equation (5), there is obtained $$\cos \gamma \quad (5)';$$

since $\sin^2 \theta + \cos^2 \theta = 1$, there is obtained $$\sin \gamma = \sqrt{(1 - \cos^2 \gamma)} \quad (6);$$

by assigning value (5)' to Equation (6), there is obtained $$\sin \gamma \quad (6)';$$

by assigning values (1) to (3) and (6)' to Equation (4), Y is obtained; and when Y is obtained, the clearance value d3 is determined from a predetermined relationship between Y and d3.

For example, with r1=15 (mm), r2=9 (mm), and e=1.5 (mm), a=10.5 (mm), b=16.5 (mm), and c=24+d3. Thus, for individual certain valve clearance values d3, measured values of the center-to-center distance 2Y between the tip ends are obtained beforehand, thereby obtaining a relational expression which represents the relationship between the valve clearance values d3 and the measured values 2Y. Subsequently, when a certain measured value 2Y (e.g., 2Y=11.977 (mm)) is obtained, by use of the relational expression, the valve clearance value d3 calculated (e.g., d3=0.00 (mm)). That is, the relationship between the measured value 2Y and the valve clearance value d3 is expressed by a linear function; thus, when the measured value 2Y is obtained, the valve clearance value d3 is uniquely determined.

The measuring and adjusting methods according to the present embodiment, the first modification, and the second modification described above are characterized in that a pair of probes each having the round tip end 14 slightly larger than the very small valve clearance 13 between the two members; i.e., the cam shaft 11 and the cam shaft abutment portion 12, is brought into direct contact with the valve clearance 13.

First, the center-to-center distance 2Y between the two tip ends. 14 is measured (measuring step S1), and, on the basis of the measured center-to-center distance 2Y, the actual valve clearance value d1 (or d2, or d3) is calculated and measured (calculating step S2). The adjust screw is rotated in an arbitrary direction, while the actual valve clearance value d1 is measured in real time, so as to adjust the valve clearance value of the valve clearance to a desired valve clearance value (target value) (adjusting step S3).

In contrast to the valve clearance measuring apparatus described in Patent Document 1 in which a valve clearance value is estimated from a difference, the calculated actual valve clearance value d1 is obtained through direct measurement of the valve clearance 13. Therefore, the valve clearance value d1 is highly accurate. That is, in measurement of the valve clearance value d1 of the valve clearance 13, the valve clearance 13 is a unique, absolutely true one. Thus, the valve clearance value employed in the measuring and adjusting method of the present embodiment; i.e., the actual valve clearance value d1 obtained through direct measurement of the valve clearance 13, is a value most close to a true value (a raw value).

In the measuring step S1, the tip ends 14 are caused to approach each other while following the profile of the circular surface of the cam shaft 11, whereby the tip ends 14 can be reliably fitted to the valve clearance 13. Therefore, the accuracy of the valve clearance value d1 is further enhanced.

The actual valve clearance value d1 obtained in the calculating step S2 is a true value of the valve clearance 13 as described above. Therefore, the desired valve clearance value can be obtained reliably by means of controlling the rotation of the adjust screw, while measuring the actual valve clearance value d1 in real time, such that the valve clearance value of the valve clearance becomes equal to the desired valve clearance value (target value).

Next, a valve clearance measuring and adjusting device will be described.

Second Embodiment

Figure 4:
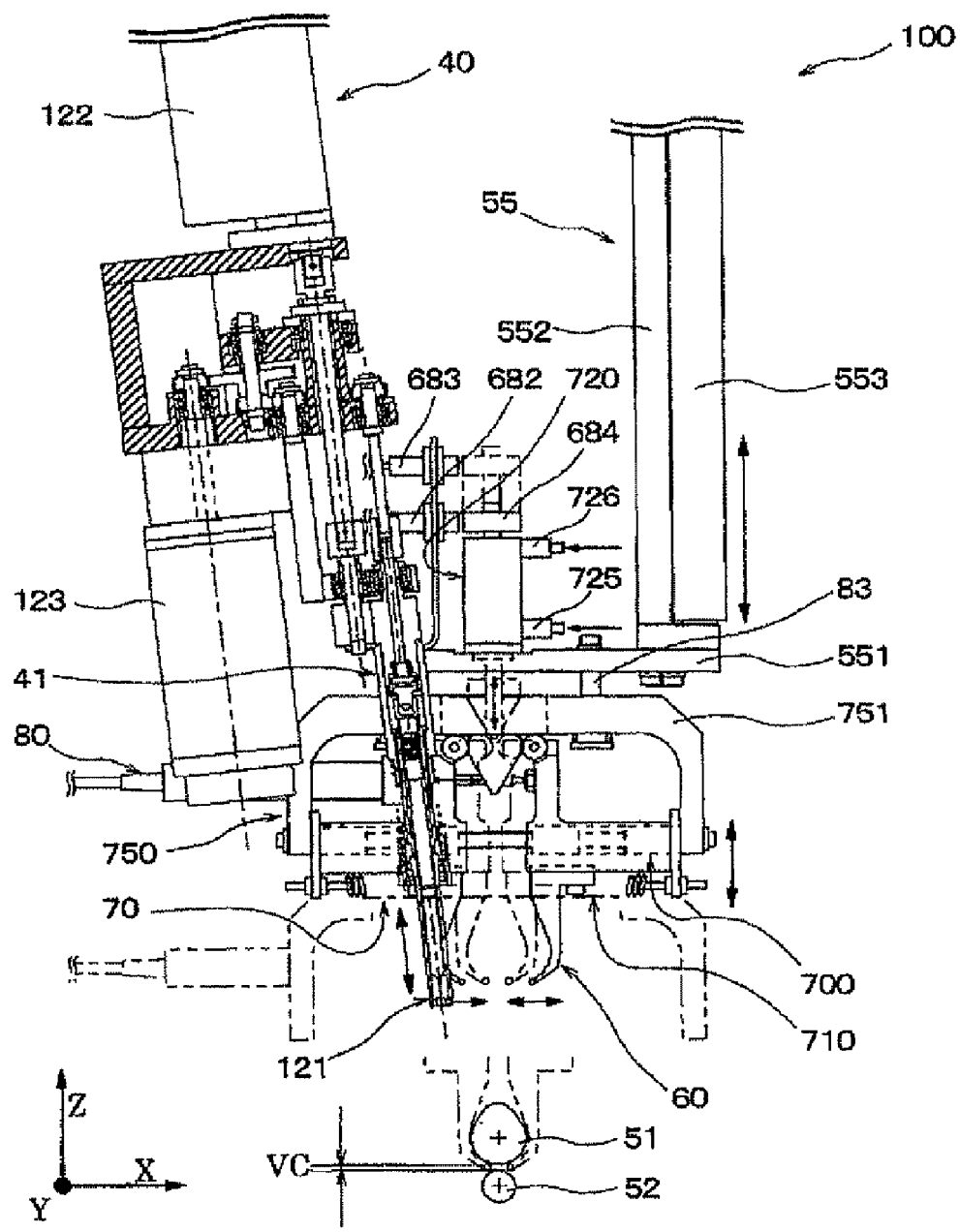
FIG. 4 Diagram for explaining a valve clearance measuring and adjustment device according to a second embodiment of the present invention.
Figure 5:
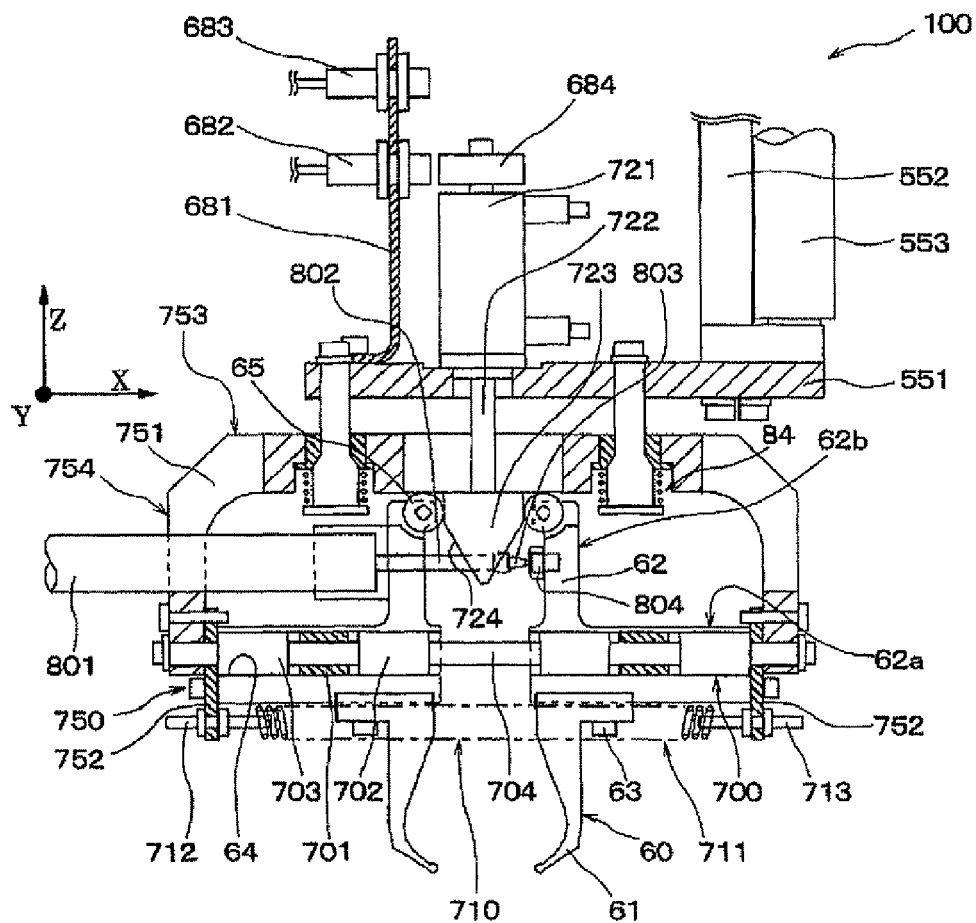
FIG. 5 Enlarged partially cutaway view of FIG. 4.
Figure 6:
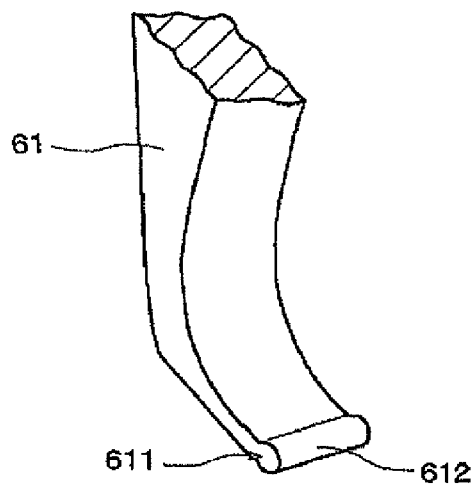
FIG. 6 Enlarged perspective view of a tip end of a probe in FIG. 5.

FIG. 4 shows a front view of a valve clearance measuring and adjusting device according to a preferred embodiment of the present invention; FIG. 5 shows an enlarged partially cutaway view of FIG. 4; and FIG. 6 shows a perspective view of a tip end of a probe.

As shown in FIG. 4, the measuring and adjusting device according to the present embodiment includes a pair of probes 60; a holding means 750 for holding the probes 60; a moving means 55; a drive means 70; a measuring means 80; a valve clearance adjusting unit 40, and a calculating means (not shown). The probes 60, the holding means 750, the moving means 55, the drive means 70, and the measuring means 80 constitute a measuring unit 100.

(Probes)

As shown in FIG. 5, each of the probes 60 is configured as follows: a claw member 61 is fixed to a probe block 62 having an L-shaped cross section by use of a bolt 63 to thereby be provided in a suspended condition. The probe block 62 has a horizontal base portion 62a and a vertical portion 62b. The paired probes 60 are configured as follows: the vertical portions 62b of the probe blocks 62 are disposed such that their backs face each other, and tip end portions of the claw members 61 are curved toward the center (toward each other).

The base portions 62a of the probe blocks 62 have respective through holes 64 extending in the direction of the X-axis in FIG. 5. The through holes 64 of the paired probes 60 are aligned with each other. Two rollers 65 rollable on the X-Z plane in FIG. 5 are provided at respective upper positions on the vertical portions 62b of the probe blocks 62. The two rollers 65 are in contact with a taper surface 724 of a rectilinear cam 723, which will be described later.

As shown in FIG. 6, each of the claw members 61 has a round tip end 611 slightly larger than the valve clearance VC shown in FIG. 4. Each of the tip ends 611 assumes the form of a column having a substantially circular section. Peripheral surfaces 612 of the substantially circular columns are fitted to and brought into direct contact with the valve clearance VC.

(Holding Means)

The holding means 750 include an arch bracket 751 which holds the paired probes 60 via a shaft 704, which will be described later, and two plates 752 suspended from the bracket 751. Each of the plates 752 is disposed between the corresponding vertical portion 754 of the bracket 751 and the corresponding probe block 62. Each of the plates 752 and the bracket 751 are tightened together by a tightening means, such as a bolt.

Figure 7:
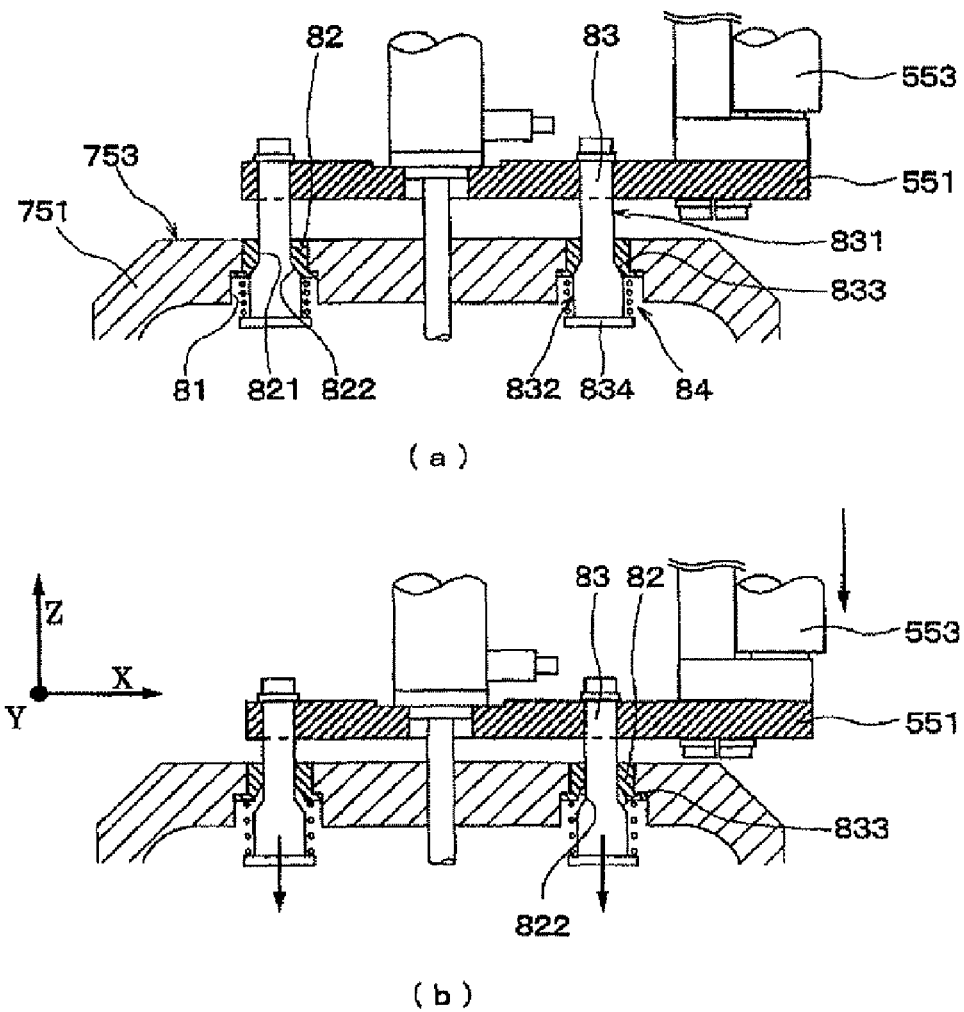

As shown in FIG. 7(a), an upper horizontal portion 753 of the bracket 751 has two through holes 81 extending therethrough in the vertical direction. Each of the through holes 81 has a stepped portion at which diameter is expanded downward, and a bushing 82 is seated on the stepped portion from underneath. A lower edge of an opening 821 of each of the bushings 82 is formed into a taper surface 822 whose diameter increases downward.

Each of pins 83 has an upper small-diameter portion 831 and a lower large-diameter portion 832. A taper portion 833 is formed at the boundary between the small-diameter portion 831 and the large-diameter portion 832. Further, the large-diameter portion 832 has a flange portion 834 formed at the bottom thereof. A compression spring 84, which will be described later, is fitted to the large-diameter portion 832, and the lower end of the compression spring 84 rests on the flange portion 834.

The circular columnar pins 83 are inserted through the openings 821 of the bushings 82 via the compression springs 84. Upper portions of the small-diameter portions 831 projecting from the openings 821 are fixed to a horizontal bracket 531. At this time, because of their own weights of the paired probes 60, the holding means 750, the drive means 70, and the measuring means 80, the taper surfaces 822 are seated on the respective taper portions 833 in a condition that the bushings 82 compress the respective compression springs 84.

(Moving Means)

As shown in FIG. 4, the moving means 55 includes the horizontal bracket 551, a vertical bracket 552 standing on the horizontal bracket 551, and an elevating mechanism 553 whose piston is fixed, at one end, to the vertical bracket 552 and which is fixed to an unillustrated fixed structure. The horizontal bracket 551 is connected to the bracket 751 via the aforementioned pins 83. The elevating mechanism 553 is provided in such a manner as to be retractable in the direction of the Z-axis in FIG. 4. When the piston of the elevating mechanism (air cylinder) 553 extends, the entire measuring unit 100 excluding the elevating mechanism 553 moves downward. When the piston of the elevating mechanism 553 retracts, the entire measuring unit 100 excluding the elevating mechanism 553 moves upward.

By virtue of the moving means 55, the paired probes 60 can be moved to a valve clearance position (or the two members 51 and 52 can be moved to a position between the paired probes 60).

In addition to an air cylinder, an oil hydraulic cylinder, a servomotor, a screw feed mechanism which uses a ball screw, an electromagnetic actuator which uses solenoid, etc. can be applied to the elevating mechanism 553.

(Drive Means)

The drive means 70 includes a linear motion guide 700, a tension spring 710, and a side mechanism 720.

As shown in FIG. 5, the linear motion guide 700 is held by the bracket 751 and supports the paired probes 60 in such a manner as to allow opening and closing of the paired probes 60. Specifically, in the through hole 64 of each of the aforementioned probe blocks 62, LM stroke members 702 and 703 are disposed with a collar 701 therebetween. The shaft 704, which serves as a linear motion guide, is inserted through the two through holes 64 and fitted through the collars 701 and the LM stroke members 702 and 703. Opposite ends of the shaft 704 are fixed to the bracket 751. The LM stroke members 702 and 703 allow the paired probes 60 to slide along the shaft 704 in the direction of the X-axis. The LM stroke member is a limited-stroke-type rectilinear guide mechanism which can guide a rotary motion and a reciprocating motion in a rolling manner.

The tension spring 710 includes a spring body 711 disposed in parallel with the shaft 704 of the linear motion guide 700, and hook members 712 and 713 disposed at respective opposite end portions of the spring body 711. The hook members 712 and 713 are fixed to and held by the two respective plates 752 suspended from the bracket 751. The tension spring 710 is disposed in such a condition as to urge the probe blocks 62 inward via the plates 752. The paired probes 60 are closed by the tension spring 710.

The slide mechanism 720 includes an actuator 721 held by the horizontal bracket 551 of the moving means 55 and adapted to provide vertically rectilinear driving, and a rectilinear cam 723 connected to the actuator 721 and having a taper surface 724 formed at a tip end thereof. The actuator 721 lowers the rectilinear cam 723, whereby the aforementioned rollers 65 roll on the taper surface 724. As a result, the paired probes 60 are opened. An example of the actuator 721 is an air cylinder. Two air supply ports 725 and 726 are connected to the air cylinder 721. When air is supplied from the air supply port 726, a piston 722 extends. When air is supplied from the other air supply port 725, the piston 722 retracts. In addition to the air cylinder 721, an oil hydraulic cylinder, a servomotor, a screw feed mechanism which uses a ball screw, an electromagnetic actuator which uses solenoid, etc. can be applied to the actuator 721.

(Measuring Means)

As shown in FIG. 5, the measuring means 80 for measuring the center-to-center distance between tip ends 611 of the paired probes 60 is attached to one of the vertical portions 754 of the bracket 751. The measuring means 80 includes a stem 801, which is a body portion, and a spindle 802, which is accommodated in the stem 801 slidably along the axial direction and has a probe 803 at a tip thereof. The spindle 802 is urged at all times in the direction of projection from the stem 801 (in the direction of the X-axis in FIG. 5). An example of the measuring means 80 is a digital gauge.

The stem 801 is fixed to the vertical portion 754 (bracket 751) and the probe bock 62 which are located on one side (left side in FIG. 5). A stop pin 804 is provided on an inward facing side (left-hand side) of the vertical portion 62*b* of the probe block 62 located on the other side (right side in FIG. 5). The probe 803 of the extended spindle 802 is brought into contact with the stop pin 804, thereby measuring the center-to-center distance between the tip ends 611 of the paired probes 60.

The measuring means 80 is not limited to the digital gauge, and any measuring device may be used so long as the measuring device can measure the center-to-center distance between the tip ends 611 of the paired probes 60. For example, a length measuring sensor which can perform distance measurement with accuracy on the μm order can be used.

(Valve Clearance Adjusting Unit)

As shown in FIG. 4, the valve clearance adjusting unit 40 includes a nut runner section 41 which includes at least one nut runner 121 for rotating an adjust screw (not shown), and a first elevating section (not shown) which is connected to the nut runner section 41 and which slides the nut runner section 41 along the axial direction of the adjust screw.

Figure 9:
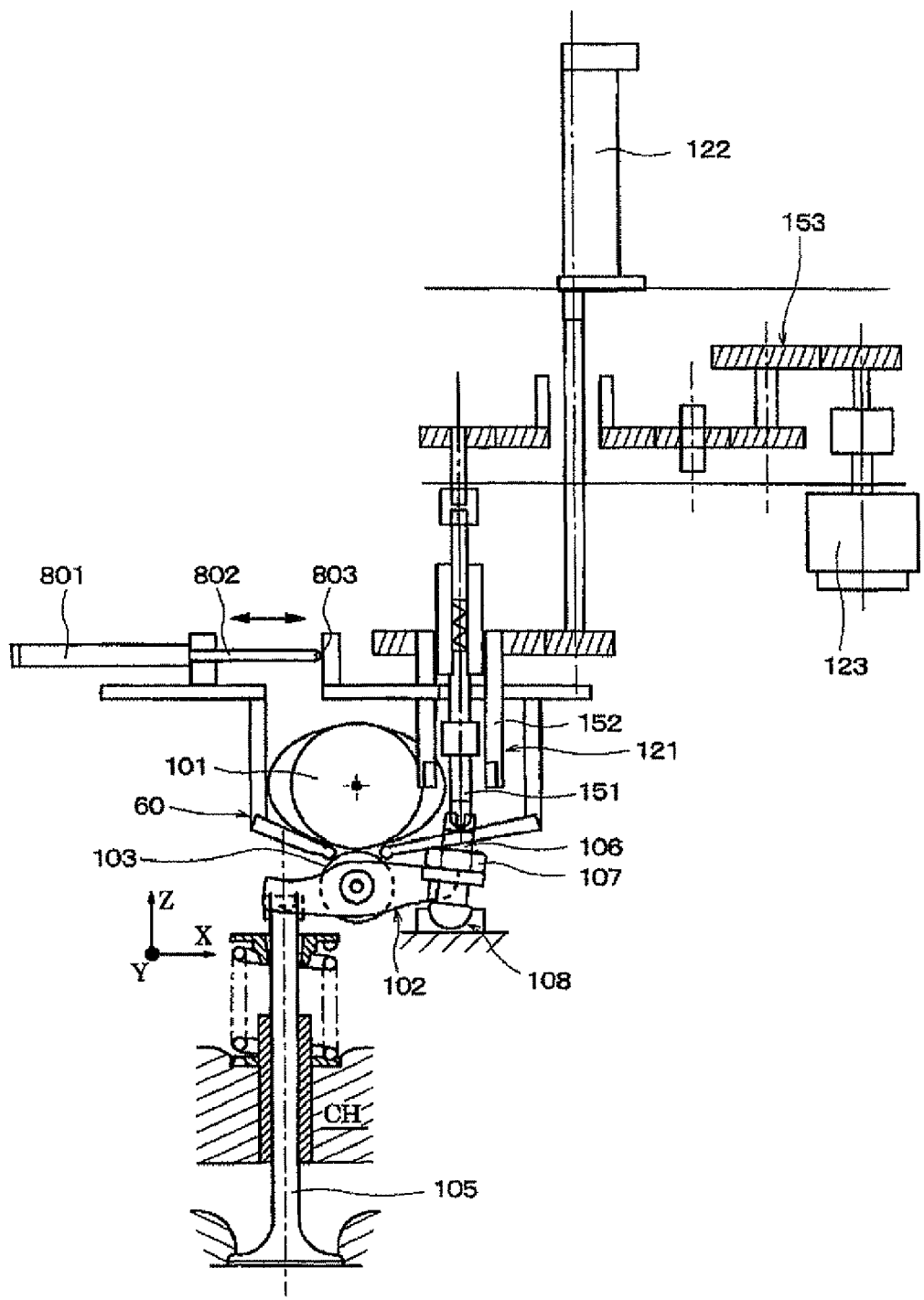
FIG. 9 Schematic view of an upper portion of a cylinder head and a nut runner section used for describing a valve clearance measuring and adjusting method according to a preferred embodiment of the present invention.

A nut runner servomotor 122 is connected to each nut runner 121 of the runner section 41 in order to rotate and drive the same. As shown in FIG. 9, the nut runner 121 has a double structure in which a bit runner 151 to be fitted into an adjust screw 106 is disposed at the center, and a tubular nut runner body 152 to be fitted onto a lock nut 107 is disposed to surround the bit runner 151. The nut runner body 152 is connected to the nut runner servomotor 122, and the bit runner 151 is connected to a bit servomotor 123 via a speed reducer 153.

The first elevating section is composed of a slider fixed to the nut runner section 41, an actuator connected to the slider and adapted to drive the slider along the axial direction of the adjust screw, and a guide member provided along the axial direction of the adjust screw and engaged with the slider. A ball-screw mechanism, a cylinder mechanism, a linear motor mechanism, a rack and pinion mechanism, a solenoid mechanism, or the like can be used as an actuator.

Figure 11:
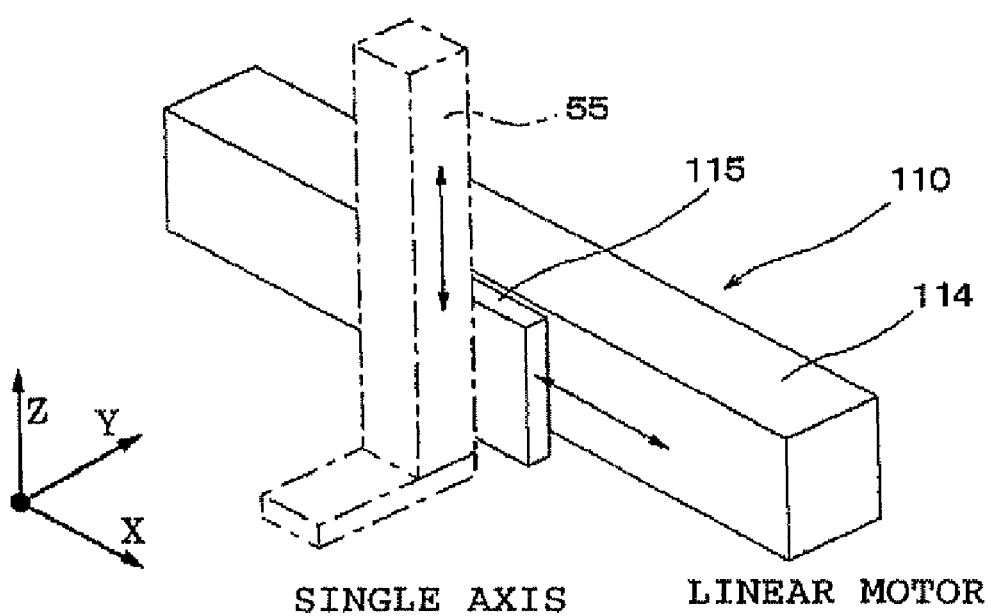
FIG. 11 Perspective view of a first slide unit of a measuring unit 100 and a second slide unit of a valve clearance adjusting unit.
Figure 12:
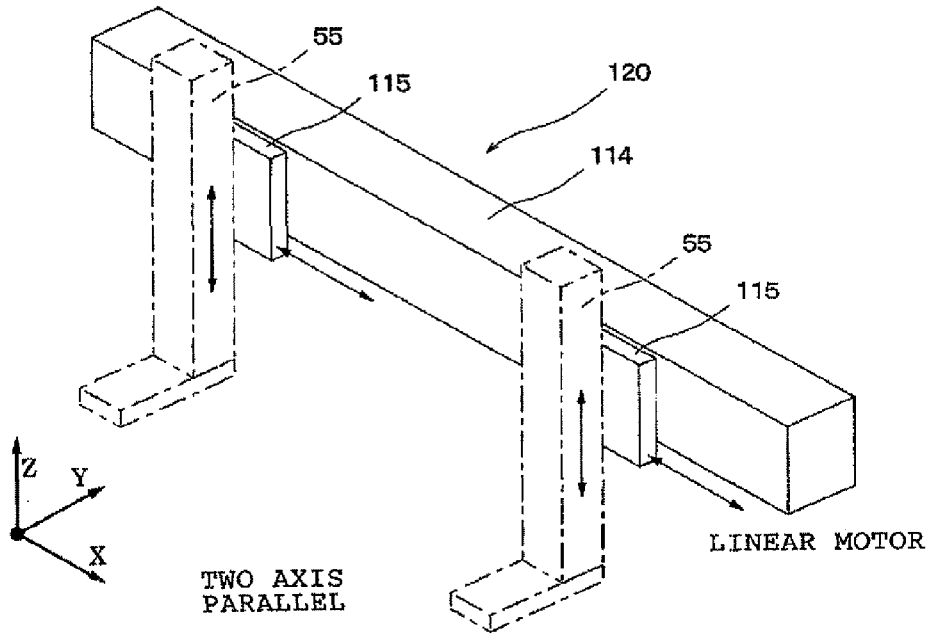
FIG. 12 View showing a first modification of the slide unit of FIG. 11.
Figure 13:
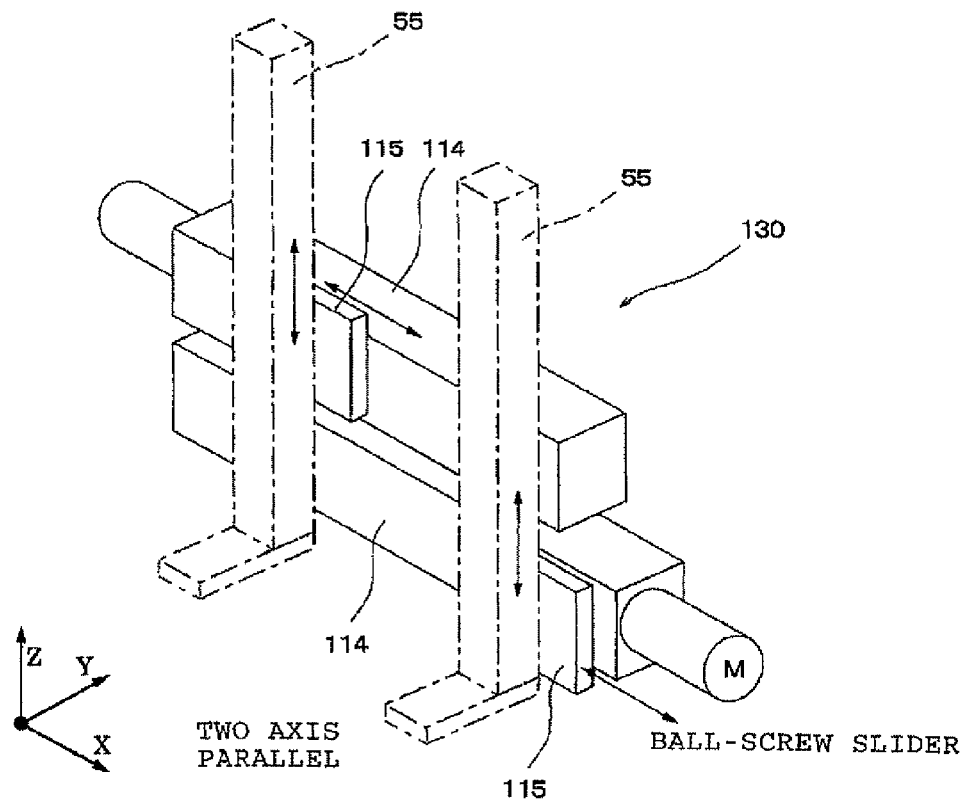
FIG. 13 View showing a second modification of the slide unit of FIG. 11.

There may be provided a first slide unit which slides the entire measuring unit 100 along the longitudinal direction of the cam shaft 51. Furthermore, the valve clearance adjusting unit 40 may include a second slide unit, which is fixedly provided on the first elevating section and adapted to individually slide the nut runner 122 along the longitudinal direction of the cam shaft 51. In the case where the measuring unit 100 and the valve clearance adjusting unit 40 are provided unitarily, providing a single slide unit is sufficient. FIGS. 11 to 13 show examples of the slide units. FIGS. 11 and 12 show slide units 110 and 120 in which a linear motor is employed as a slide mechanism actuator, and FIG. 13 shows a slide unit 130 in which a ball screw is employed as a slide mechanism actuator. Each of the slide units 110, 120, and 130 is composed of a fixed unit main body 114 disposed along an X-axis direction, and a slider 115 which is slidable in the X-axis direction along the unit main body 114. The measuring unit 100 and/or the valve clearance adjusting unit 40 (in the drawing, the moving means 55 is illustrated by an alternate long and short dash line) is provided on the slider 115 to be slidable in a Z-axis direction. A single moving means 55 (in the case of FIG. 11) may be provided to extend in the Z-axis direction. Alternatively, a plurality of (two in the case of FIGS. 12 and 13) moving means 55 may be provided such that they extend in parallel in the Z-axis direction. In the case where a linear motor is employed as a slide mechanism actuator, as shown in FIG. 12, a plurality of sliders 115, which can be driven independently of each other, are provided on the unit main body 114. In the case where a ball-screw is employed as a slide mechanism actuator, as shown in FIG. 13, two unit bodies 114 (including motors) are arranged in the Z-axis direction, and the slider 115 is attached to each unit main body 114.

Although the measuring unit 100 and the valve clearance adjusting unit 40 may differ in number, they are desirable the same in number. As described above, in the case where the measuring unit 100 and the valve clearance adjusting unit 40 are united, needless to say, they are the same in number.

A linear motor mechanism, a ball-screw mechanism, a cylinder mechanism, a rack and pinion mechanism, or the like can be used as the actuators of the first and second slide units. In particular, use of a linear motor mechanism or a ball-screw mechanism enables the measuring unit 100 and the valve clearance adjusting unit 40 to be stopped at a plurality of arbitrary positions along the longitudinal direction of the cam shaft 51.

Figure 16:
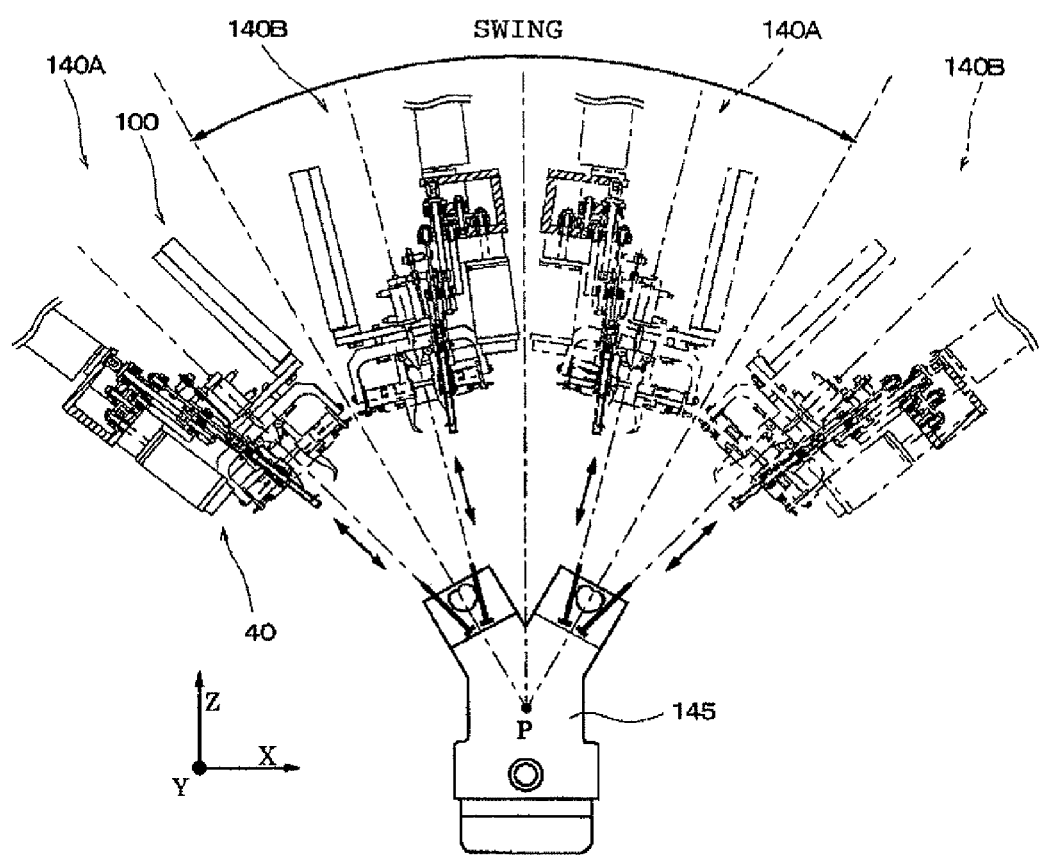
FIG. 16 Front view showing an example in which the valve clearance measuring and adjusting device of FIG. 4 is applied to a V-type engine.

Furthermore, as shown in FIG. 16, two integrated units 140A and 140B each composed of the measuring unit 100 and the valve clearance adjusting unit 40 united together may be provided for a V-type engine (or a V-type cylinder head) 145. In this case, a tilt apparatus (not shown) is provided for the two integrated units 140A and 140B (unit group) so as to swing the measuring unit 100 and the valve clearance adjusting unit 40 of each integrated unit about a point P in an X-Z plane. In this case, a tilt apparatus may be provided for mounting means (not shown) which supports the V-type engine 145 including the cam shaft 51 and the cam shaft abutment portion 52 shown in FIG. 4 so as to swing the mounting means in the direction opposite the swing direction of the measuring unit 100 and the valve clearance adjusting unit 40. Needless to say, the tilt apparatus may be provided on the mounting means side only.

Figure 17:
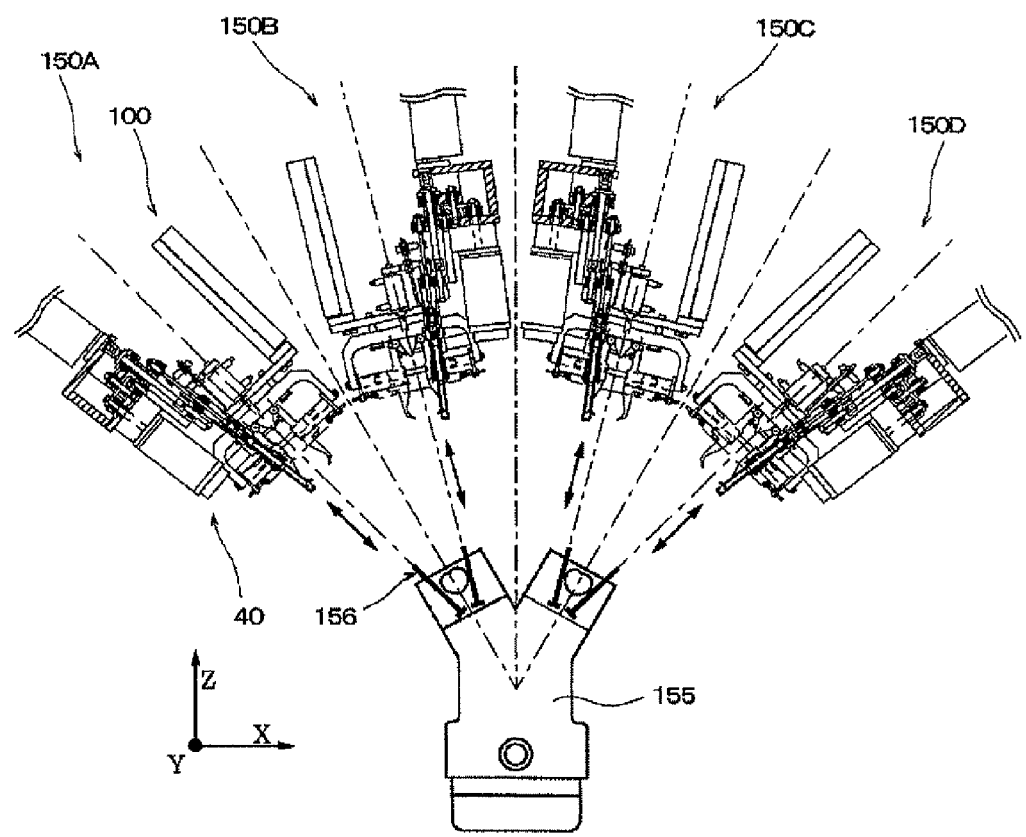
FIG. 17 Modification of FIG. 16.

Meanwhile, as shown in FIG. 17, four integrated units 150A to 150D each composed of the measuring unit 100 and the valve clearance adjusting unit 40 united together may be provided for a V-type engine (or a V-type cylinder head) 155, without use of a tilt apparatus, such that the integrated units extend along the extension directions of the corresponding valves 156. In this case, although the integrated units 150A to 150D may be constituted by four independent structures, they may be constituted by two structures which constitute a group including the integrated units 150A and 150B and a group including the integrated units 150C and 150D, respectively, or three structures which constitute the integrated unit 150A, a group including the integrated units 150B and 150C, and the integrated unit 150D, respectively.

Through employment of these configurations, it becomes possible to apply the valve clearance measuring and adjusting device of the present embodiment not only to straight-type engines but also to V-type engines.

(Calculating Means)

The aforementioned measuring means 80 is electrically connected to an unillustrated calculating means. On the basis of a center-to-center distance between the tip ends 611 measured by the measuring means 80, a valve clearance value is calculated by the calculating means. The calculating means may be an independent unit or incorporated in the moving means 55 or the slide mechanism 720. Furthermore, a control apparatus for controlling rotation of the above-mentioned bit runner 151, which rotate the adjust screw, may be provided in any of the calculating means and the control means.

(Proximity Sensor)

As shown in FIG. 5, a vertical bracket 681 stands on the horizontal bracket 551. A first proximity sensor 682 is provided at a predetermined lower position on the vertical bracket 681. A second proximity sensor 683 is provided at a predetermined upper position on the vertical bracket 681. A dog 684 is provided at an upper portion of the actuator (air cylinder) 721 of the slide mechanism 720. The attachment positions of the first and second proximity sensors 682 and 683 in relation to the bracket 681 are adjusted such that the first proximity sensor 682 detects the most opened position of the paired probes 60, whereas the second proximity sensor 683 detects the most closed position of the paired probes 60.

In the present embodiment, in order to allow the entire measuring unit 100 to be rotatable about the Z-axis, a rotary mechanism may be connected to the upper end of the moving means 55. As for the claw member 61 of the probe 60, a plurality of types different in shape and size (diameter) of the tip end 611 may be prepared beforehand for replacing the claw members as appropriate according to the valve clearance VC between the cam shaft 51 and the cam shaft abutment portion 52 shown in FIG. 9.

Next, the actions of the present embodiment will be described with reference to FIGS. 4 to 10.

Figure 8:
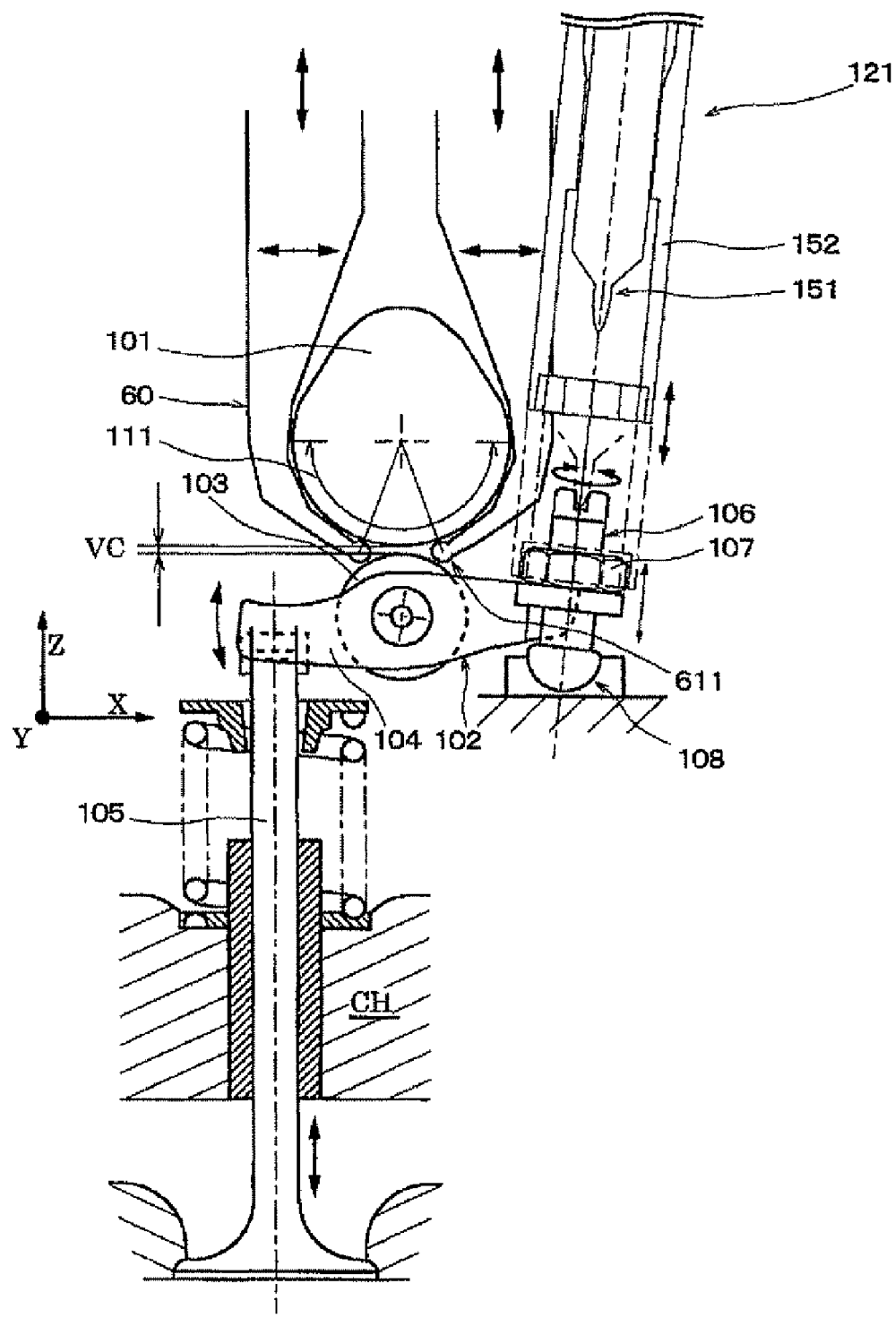
FIG. 8 Partially sectional front view showing an example in which the valve clearance measuring and adjusting device of FIG. 4 is applied to a cylinder head having a rocker-arm-type valve.

FIG. 8 shows an example in which the valve clearance measuring and adjusting device according to the second embodiment is applied to measurement and adjustment of a valve clearance for a rocker arm type. By use of the aforementioned measuring and adjusting device shown in FIG. 4, the valve clearance value of a valve clearance VC shown in FIG. 8 is measured and adjusted.

As shown in FIG. 8, the valve clearance VC is a clearance between a cam shaft 101 and a roller 103 of a rocker arm 102. The tip ends 611 of the paired probes 60 are fitted to and brought into contact with the valve clearance VC. The cam shaft 101 and the rocker arm 102 are assembled to and fixedly disposed on a cylinder head CH.

Meanwhile, one end of an arm body 104 of the rocker arm 102 is in contact with a valve 105, and the other end is in contact with an adjust screw 106. By means of turning the adjust screw 106 in a predetermined direction, the valve clearance value of the valve clearance VC can be adjusted. The arm body 104 is provided to be pivotable about the lower end of the adjust screw 106, which serves as a pivot fulcrum 108.

First, the tip ends 611 of the paired probes 60 are brought into contact with each other, and the probe 803 of the measuring means (digital gauge) 80 is brought into contact with the stop pin 804. The center-to-center distance between the tip ends 611 at this time is two times the radius (e (predetermined value) shown in FIG. 1) of the tip end 611; i.e., the diameter (2e) of the tip end 611. The value of 2e is set as the reading of the digital gauge.

By use of a master jig (not shown) in which the valve clearance VC between the cam shaft 101 and the roller 103 is set to 0 (zero), the tip ends 611 of the paired probes 60 are brought into contact with the valve clearance VC. In this condition, the clearance value is set to zero.

After completion of the above initialization, the aforementioned cylinder head is conveyed to a measuring zone by an unillustrated conveying means. Subsequently, the predetermined cam shaft 101 and rocker arm 102 to be subjected to measurement of the valve clearance VC are positioned so as to be located immediately under the measuring unit 100. The number of the rocker arms 102 on the cylinder head is determined as appropriate according to the number of valves of an engine. A plurality of the measuring units 100 may be provided along the direction of conveyance. For example, the number of the measuring units 100 is rendered equal to the number of valves.

Subsequently, as shown in FIG. 4, the elevating mechanism 553 of the moving means 55 is driven to move downward the entire measuring unit 100 excluding the elevating mechanism 553.

During the course of this downward movement, when the level of the tip ends 611 of the paired probes 60 in the vertical direction (in the direction of the Z-axis in FIG. 4) reaches, for example, the position of a base circle (the range denoted by reference numeral 111 in FIG. 8), which is a circular portion of the cam shaft 101, an operation of closing the paired probes 60 starts. Specifically, the air cylinder 721 of the slide mechanism 720 of the drive means 70 is driven to move the piston 722 upward. As a result, the rollers 65 of the paired probes 60 roll along the taper surface 724 of the rectilinear cam 723, and an urging force of the tension spring 710 directed in a closing direction initiates the closing of the paired probes 60. The timing of the start of driving of the cylinder 721 is preset such that, when the stroke of the elevating mechanism 553 reaches a certain fixed value, the air cylinder 721 is interlockingly driven.

Even during the course of closing of the paired probes 60, the elevating mechanism 553 continues moving the measuring unit 100 downward. At this time, an urging force of the tension spring 710 directed in a closing direction causes the paired probes 60 to be gradually closed in such a manner as to follow the profile of the base circle. Therefore, the tip ends 611 follow the profile of the base circle at all times. That is, the paired probes 60 are moved downward while being closed in such a manner as to follow the profile of the base circle of the cam shaft 101.

In the course of closing of the paired probes 60, when the tip ends 611 are fitted to and brought into contact with the valve clearance VC, the downward movement of the entire measuring unit 100 is stopped, since the cylinder head CH is a fixed structure. However, in this condition, due to its own weight of the measuring unit 100 (particularly, the holding means 750, the drive means 70, and the measuring means 80), it is uncertain whether or not the tip ends 611 are reliably located at the position of the valve clearance VC. Thus, the measuring and adjusting device according to the present embodiment has a floating mechanism effected by the pins 83 inserted through the bracket 751.

When the tip ends 611 are brought to the position of the valve clearance VC and brought into contact with the valve clearance VC, the piston 722 of the air cylinder 721 is raised to the highest level. In association with this rise, the dog 684 attached to the piston 722 is detected by the second proximity sensor 683. Upon this detection, the elevating mechanism 553 is slightly moved downward.

At this time, since the tip ends 611 are located and fixed at the position of the valve clearance VC, the bracket 751, which is united with the paired probes 60, is not moved downward. Meanwhile, since the bracket 751 is merely seated on the pins 83, which are connected to the elevating mechanism 553 via the horizontal bracket 551, and is not fixed to the pins 83, the pins 83 are moved downward while following the movement of the elevating mechanism 553. As a result, as shown in FIG. 7(b), the taper portions 833 of the pins 83 and the taper surfaces 822 of the bushings 82 are separated from each other.

In association with this separation, urging forces of the compression springs 84 directed upward in the vertical direction push up the bracket 751 in the vertical direction (the direction of the Z-axis in FIG. 7(b)) via the bushings 82, thereby canceling their own weights of the holding means 750, the drive means 70, and the measuring means 80. By virtue of this cancellation of their own weights; i.e., a floating action, the tip ends 611 search for the position of the valve clearance VC (or move around toward the position of the valve clearance VC) and reliably reach the position of the valve clearance VC.

In a condition in which the tip ends 611 are fitted to the valve clearance VC, the reading of the measuring means 80 whose probe 803 is in contact with the stop pin 804 is a measured value of the center-to-center distance between the tip ends 611 (measuring step S1). An actual clearance value is calculated and measured from the center-to-center distance between the tip ends 611 according to formulas (refer to Expressions 1, 2, and 3) stored in a PLC of the calculating means (calculating step S2).

Next, the valve clearance value between the cam shaft 101 and the roller 103 of the rocker arm 102 is adjusted (adjusting step S3). The adjusting step S3 is composed of an accustoming operation step and a clearance adjusting step.

<Accustoming Operation Step>

First, the adjust screw 106 and the lock nut 107, which are in their initial states, are initially loosened. Specifically, the nut runner body 152 is fitted onto the lock nut 107, and the lock nut 107 is loosened; and the bit runner 151 is fitted into the adjust screw 106, and the adjust screw 106 is loosened.

Figure 10:
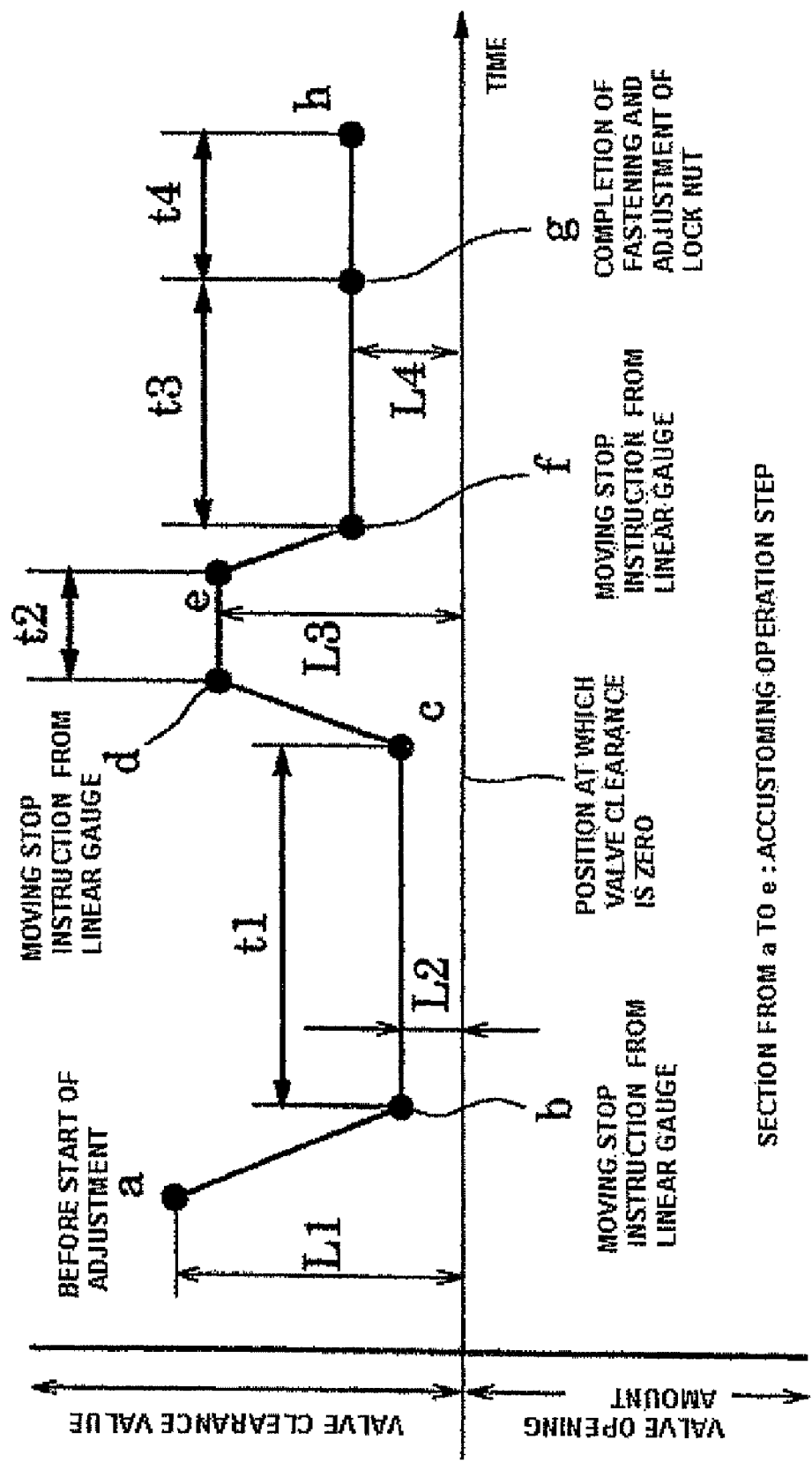
FIG. 10 Chart showing change in valve clearance value with movement of an adjust screw.

Next, by means of rotating the adjust screw 106 in one direction (clockwise), as shown in FIG. 10, the adjust screw 106 is fasten from an initial state (position a) in which the cam shaft 101 and the roller 103 are separated from each other with an arbitrary valve clearance value L1, to a state (position b) in which the cam shaft 101 and the roller 103 are separated from each other with an arbitrary valve clearance value L2 (section from a to b in FIG. 10). After that, this state in which the arbitrary valve clearance value L2 is provided is maintained for an arbitrary first stable time t1 (section from b to c). After that, by means of rotating the adjust screw 106 in the reverse direction (counterclockwise), the he adjust screw 106 is loosened from a state (position c) in which the cam shaft 101 and the roller 103 are separated from each other with the arbitrary valve clearance value L2 to a state (position d) in which the cam shaft 101 and the roller 103 are separated from each other with an arbitrary valve clearance value L3 (section from c to d in FIG. 10). After that, this state is maintained for an arbitrary time t2 (section from d to e in FIG. 10).

By virtue of this accustoming operation step, accustomed engagement (screw engagement) is established among the adjust screw 106, the bit runner 151, and the rocker arm 102, whereby the adjustment work accuracy of a clearance adjusting step to be described later is improved.

When the adjust screw 106 is rotated in the fastening direction or the loosening direction, in either case, rotation of the adjust screw 106 is stopped on the basis of the center-to-center distance between tip ends 611 of the paired probes 60 measured by the measuring means 80. Further, when the adjust screw 106 is fastened, the valve clearance value decreases gradually; and when the adjust screw 106 is loosened, the valve clearance value increases gradually <Clearance Adjusting Step>

By means of the bit runner 151, the adjust screw 106 is rotated in the fastening direction from the state (position e) in which the cam shaft 101 and the roller 103 are separated from each other with the arbitrary valve clearance value L3 to the state (position f) in which the cam shaft 101 and the roller 103 are separated from each other with a desired valve clearance value L4 (section from e to f in FIG. 10). The arbitrary valve clearance value L3 is set to be greater than the desired valve clearance value L4 (L3>L4) to be described later.

After that, this state is maintained for an arbitrary time t3 (section from f to g). Finally, the lock nut 107 is fastened by use of the nut runner body 152, and this state is maintained for an arbitrary time t4 (section from g to h), whereby adjustment of the valve clearance is completed.

In the case where the adjust screw 106 is rotated in the fastening direction as well, as in the above-describing accustoming operation step, rotation of the adjust screw 106 is stopped on the basis of the center-to-center distance measured by the measuring means 80. Specifically, in the clearance adjustment step, the adjust screw 106 is rotated, while the actual valve clearance between the cam shaft 101 and the roller 103 is measured in real time. The fastening rotation of the adjust screw 106 is controlled on the basis of the center-to-center distance measured by the measuring means 80 such that the actual valve clearance value becomes equal to the desired valve clearance value L4. Since the valve clearance is adjusted to the desired valve clearance value L4 through this control, the desired valve clearance value L4 can be obtained reliably.

When measurement and adjustment of the valve clearance value have not yet been completed for all the valves 105, the first slide unit of the measuring unit 100 and/or the second slide unit of the valve clearance adjusting unit 40 are driven, and measurement and adjustment of the valve clearance value are successively performed for the remaining valves 105. After completion of the measurement and adjustment of the valve clearance value, the cylinder head is conveyed to the next stage by conveying means.

Notably, the arbitrary valve clearance value L3 may be set to be smaller than the desired valve clearance value L4 (L3<L4). In this case, the adjust screw 106 is rotated in the loosening direction by the bit runner 151.

Figure 14:
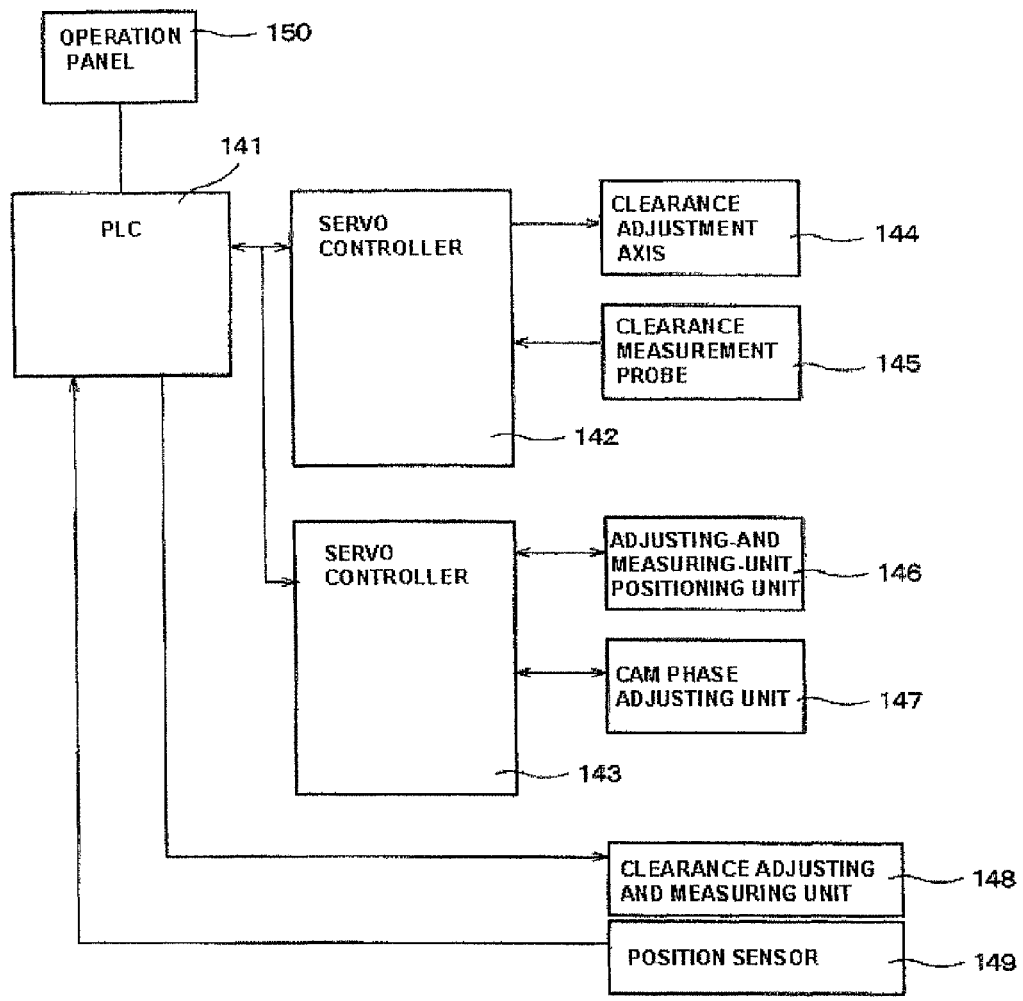
FIG. 14 Control block diagram for valve clearance adjustment and measurement.

As shown in FIG. 14, which is a control block diagram for valve clearance adjustment and measurement, servo controllers 142 and 143, a clearance adjusting and measuring unit 148, a position sensor 149, and an operation panel 150 are connected to a PLC 141. A clearance adjustment axis 144 and a clearance measurement probe 145 are connected to the servo controller 142. An adjusting-and-measuring-unit positioning unit 146 and a can phase adjusting unit 147 (a unit for adjusting the phase of the cam shaft 51 in FIG. 4) are connected to the servo controller 143. Flows of electric signals between blocks are unidirectional or bidirectional. Specifically, electric signals flow unidirectinally from the servo controller 142 to the clearance adjustment axis 144, from the clearance measurement probe 145 to the servo controller 142, from the PLC 141 to the clearance adjusting and measuring unit 148, and from the position sensor 149 to the PLC 141. Flows of electric signals between the remaining blocks are bidirectional.

A flow of operation of valve clearance adjustment and measurement will be described with reference to the control block diagram shown in FIG. 14.

Figure 15:
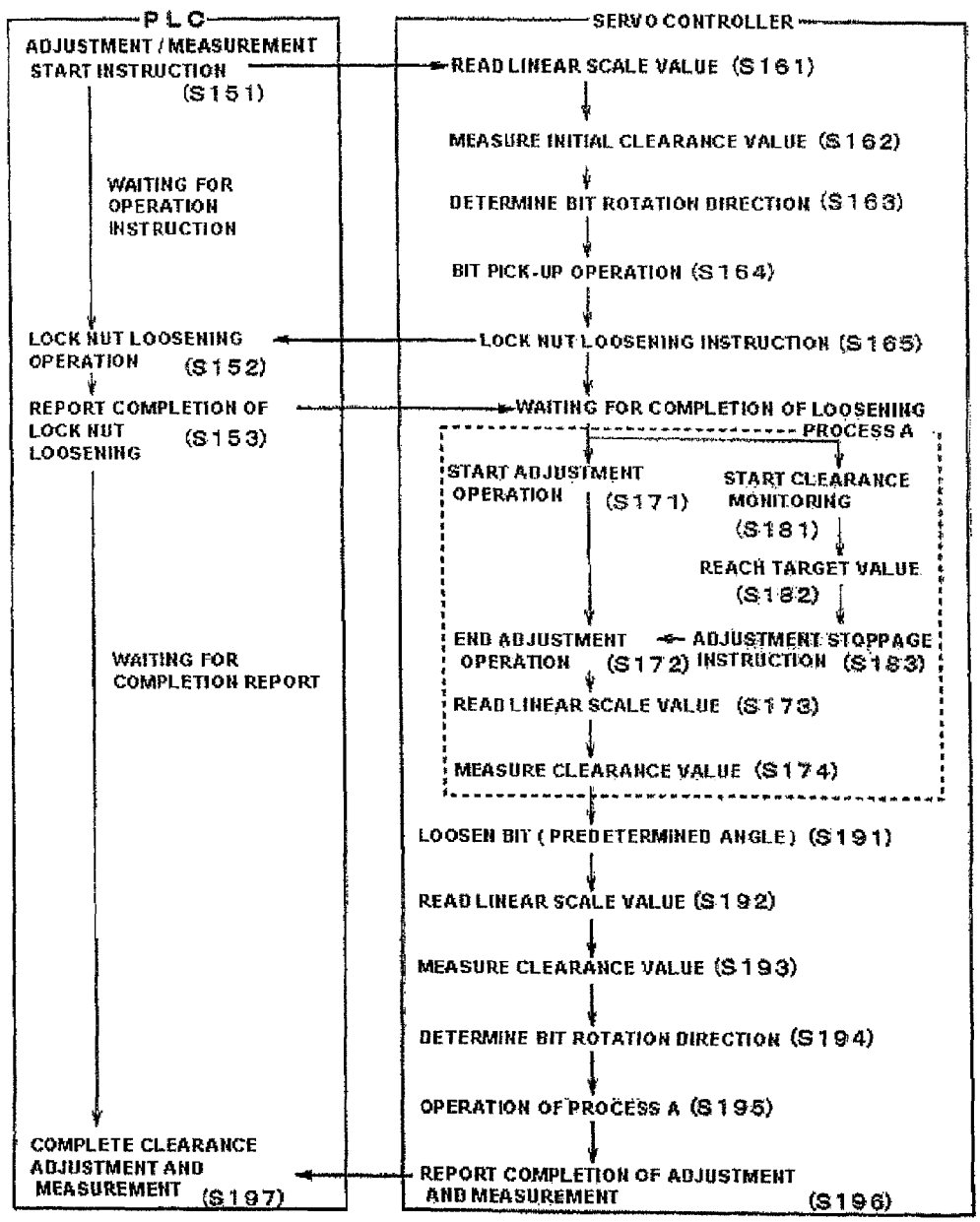
FIG. 15 Chart showing a flow of valve clearance adjustment and measurement operation.

As shown in FIG. 15, an adjustment/measurement start instruction is first sent from the PLC 141 to the servo controllers 142 and 143 (S151). After that, the PLC 141 enters a state for waiting an operation instruction.

A linear scale value is read from the clearance measurement probe 145 (S161; position a in FIG. 10), and an initial clearance value is measured (S162). The bit rotation direction is determined on the basis of the initial clearance value (S163), and a bit pick-up operation is performed (S164). After that, a lock-nut loosening instruction is sent to the PLC 141 (S165). After that, the servo controllers 142 and 143 enter a state for waiting completion of loosening of the lock nut.

In the clearance adjusting and measuring unit 148, lock nut loosening operation is performed (S152), and completion of loosening of the lock nut is reported to the servo controllers 142 and 143 (S153). After that, the PLC 141 enters a state for waiting completion of adjustment and measurement.

When the completion of loosening of the lock nut is reported to the servo controllers 142 and 143, an operation of adjusting the valve clearance is started by the clearance adjustment axis 149 and the clearance adjusting and measuring unit 148 (S171). Also, monitoring of the valve clearance is started by the clearance measurement probe 145 (S181). When the valve clearance reaches a target value (S182), stoppage of the adjustment is instructed (S183), whereby the adjusting operation is ended (S172). After that, the linear scale value is read from the clearance measurement probe 145 (S173; position b in FIG. 10), and the clearance value is measured (S174). This series of steps (S171 to S174 and S181 to S183) will be referred to "process A."

After the bit is loosened by a predetermined angle by the clearance adjusting and measuring unit 148 (S191), the linear scale value is read from the clearance measurement probe 145 (S192; position d in FIG. 10), and the clearance value is measured (S193). After that, the bit rotation direction is determined (S194), and the process A is repeated (S195; section from e to f in FIG. 10). After that, the completion of the adjustment and measurement is reported from the servo controllers 142 and 143 to the PLC 141 (S196), whereby the clearance adjustment and measurement is completed (S197).

As described above, in the measuring and adjusting device of the present embodiment, rotation of the adjust screw 106 is controlled, while the actual valve clearance value is measured in real time by use of the measuring means 80, such that the actual valve clearance value becomes equal to the desired valve clearance value. Thus, the valve clearance can be adjusted to the desired valve clearance value L4 reliably and accurately.

Meanwhile, in the cylinder head CH, the base circle profile of the cam shaft 101, the lever ratio of the rocker arm 102, and the center positions of the cam shaft 101 and the roller 103 of the rocker arm 102 differ in error among valves, so that assembling accuracy varies among the valves. Therefore, it is not easy to reliably bring the tip ends 611 of the paired probes 60 to the position of the valve clearance VC. Also, if an attempt to close the paired probes 60 is performed after the paired probes 60 are lowered completely, the paired probes 60 cannot be closed due to interference with the adjust screw 106. As a result, the tip ends 611 fail to be brought into direct contact with the valve clearance VC.

In contrast, according to the measuring and adjusting device of the present embodiment, the paired probes 60 are lowered while the tip ends 611 of the pair of probes 60 are closed in such a manner as to follow the profile of the base circle of the cam shaft 101. Thus, irrespective of assembling accuracy, the tip ends 611 can be brought into direct contact with the valve clearance VC and can be reliably brought to the position of the valve clearance VC. As a result, an accurate clearance value can be obtained. Also, each of the tip ends 611 assumes the form of a column having a substantially circular section, and the peripheral surfaces 612 of the tip ends 611 are brought into contact with the valve clearance VC. Thus, contact between the tip ends 611 and each of the members 101 and 103 at the clearance position is line contact in the direction of the Y-axis in FIG. 8, rather than point contact. Therefore, the tip ends 611 can be stably in contact with the position of the valve clearance VC.

Also, the measuring and adjusting device of the present embodiment is adapted for the case where the cam shaft abutment portion is the roller-type rocker arm 102. However, the valve clearance measuring and adjusting device of the present embodiment is not limited to the valve clearance measurement and adjustment for a cylinder head having such a roller-type rocker arm. Needless to say, the valve clearance measuring and adjusting device of the present embodiment can be applied to the valve clearance measurement and adjustment for a cylinder head having a rocker arm whose slipper surface serves as the camshaft abutment portion.

The measuring and adjusting device of the present embodiment has been described while mentioning the moving means in which the elevating mechanism 553 is connected to the horizontal bracket 551 for moving the measuring unit 100 downward. However, the present invention is not limited thereto. For example, the following configuration may be employed: under the conveying means is provided moving means for unloading a cylinder head from the conveying means and moving the cylinder head upward, and the moving means moves the cylinder head upward. In this case, there is no need to move the measuring unit 100 vertically, and only an operation of opening and closing the paired probes 60 suffices.

Needless to say, the present invention is not limited to the above embodiments, but may be embodied in various other modes.

DESCRIPTION OF REFERENCE NUMERALS

| | |
|---|---|
| 11: | cam shaft |
| 12: | cam shaft abutment portion |
| 13: | valve clearance |
| 14: | tip end |
| 101: | cam shaft |
| 103: | roller (cam shaft abutment portion) |
| VC: | valve clearance |
| S1: | measuring step |
| S2: | calculating step |
| S3: | adjusting step |
| d1, d2, d3: | valve clearance value |

The invention claimed is:

1. A valve clearance measuring and adjusting method for a cylinder head which includes a valve assembled to a cylinder head main body, a rocker arm which is connected at one end to an end of the valve, and a can shaft which comes into contact with a cam shaft abutment portion of the rocker arm having an arcuate surface so as to open and close the valve, the rocker arm including an adjust screw for adjusting a valve clearance between the cam shaft and the cam shaft abutment portion, the method being characterized by comprising:
   a step of bringing a pair of probes each having a round tip end slightly larger than the valve clearance into direct contact with the cam shaft and the cam shaft abutment portion and measuring a center-to-center distance between the two tip ends;
   a calculating step of calculating and measuring an actual valve clearance value on the basis of the center-to-center distance between the tip ends; and
   an adjusting step of rotating the adjust screw in an arbitrary direction, while measuring the actual valve clearance value in real time, to thereby adjust the actual valve clearance value to a desired valve clearance value.

2. A valve clearance measuring and adjusting method according to claim 1, wherein, in the calculating step, on the basis of a predetermined relationship between the center-to-center distance between the tip ends and the actual valve clearance value, a measured value of the center-to-center distance between the tip ends is converted to the valve clearance value.

3. A valve clearance measuring and adjusting method according to claim 1, wherein the adjusting step includes
   rotating the adjust screw in a fastening direction, while measuring the actual valve clearance value in real time, in a state in which the actual valve clearance value is set to be larger than the desired valve clearance value; and
   controlling rotation of the adjust screw such that the actual valve clearance value becomes equal to the desired valve clearance value.

4. A valve clearance measuring and adjusting method according to claim 3, wherein radii r1 and r2 of the circular surfaces of the cam shaft and the cam shaft abutment portion, respectively, and a radius e of the tip ends are predetermined; and
   when 2Y represents the center-to-center distance between the tip ends, and d1 represents the clearance value,
   on the basis of the center-to-center distance 2Y between the tip ends, the valve clearance value d1 is obtained by Expression 1:
[Expression 1]
   when the radii r1 and r2 of the circular surfaces of the first member and the second member, respectively, and the radius e of the tip ends are predetermined,
   a represents a center-to-center distance between the second member and the tip end,
   b represents a center-to-center distance between the first member and the tip end,
   s represents a segment corresponding to a segment b between the center of the first member and the center of the tip end and extending in a direction of extension of a center-to-center segment c between the first member and the second member,
   t represents a segment corresponding to a segment a between the center of the second member and the center of the tip end and extending in the direction of extension of the center-to-center segment c, and
   2Y represents a center-to-center distance between the tip ends, $a = r2 + e$ and $b = r1 + e;$ from the Pythagorean theorem, there are obtained $s^2 = b^2 - Y^2$ and $t^2 = a^2 - Y^2;$ since c=s+t, there is obtained $c = \sqrt{(b^2 - Y^2)} + \sqrt{(a^2 - Y^2)};$ and since the clearance value d1 is represented by d1=c−(r1+r2), there is obtained $d1 = \sqrt{(b^2 - Y^2)} + \sqrt{(a^2 - Y^2)} - (r1 + r2).$ 5. A valve clearance measuring and adjusting method according to claim 3, wherein the radii r1 and r2 of the circular surfaces of the cam shaft and the cam shaft abutment portion, respectively, and the radius e of the tip ends are predetermined; and
   when 2Y represents the center-to-center distance between the tip ends, and d2 represents the clearance value,
   on the basis of the center-to-center distance 2Y between the tip ends, the clearance value d2 is obtained by Expression 2:
[Expression 2]
   when the radii r1 and r2 of the circular surfaces of the first member and the second member, respectively, the radius e of the tip ends, and the clearance value d2 are predetermined,
   a represents a center-to-center distance between the second member and the tip end,
   b represents a center-to-center distance between the first member and the tip end,
   X represents a segment corresponding to a segment b between the center of the first member and the center of the tip end and extending in a direction of extension of a center-to-center segment c,
   2Y represents a center-to-center distance between the tip ends, and
   α represents an angle between the center-to-center segment c and the segment b between the center of the first member and the center of the tip end, $a = r2 + e$ \hfill (1), $b = r1 + e$ \hfill (2), $c = r1 + r2 + d2$ \hfill (3), $X = b \cdot \cos \alpha$ \hfill (4), and $Y = b \cdot \sin \alpha$ \hfill (5);

from the law of cosines $a^2=b^2+c^2-2bc\cdot\cos\alpha$, there is obtained $$\cos\alpha = \frac{(b^2+c^2-a^2)}{2bc}; \quad (6)$$

by assigning values (1) to (3) to Equation (6), there is obtained $$\cos\alpha \quad (6)';$$

since $\sin^2\theta+\cos^2\theta=1$, there is obtained $$\sin\alpha = \sqrt{(1-\cos^2\alpha)} \quad (7);$$

by assigning value (6)' to Equation (7), there is obtained $$\sin\alpha \quad (7)';$$

by assigning values (2), (6)', and (7)' to Equations (4) and (5), X and Y are obtained; and when Y is obtained, the clearance value d2 is determined from a predetermined relationship between Y and d2.

6. A valve clearance measuring and adjusting method according to claim 3, wherein radii r1 and r2 of the circular surfaces of the cam shaft and the cam shaft abutment portion, respectively, and a radius e of the tip ends are predetermined; and when 2Y represents the center-to-center distance between the tip ends, and d3 represents the clearance value, on the basis of the center-to-center distance 2Y between the tip ends, the clearance value d3 is obtained by Expression 3:

[Expression 3]

when the radii r1 and r2 of the circular surfaces of the first member and the second member, respectively, the radius e of the tip ends, and a clearance value d3 are predetermined, a represents a center-to-center distance between the second member and the tip end, b represents a center-to-center distance between the first member and the tip end, 2Y represents a center-to-center distance between the tip ends, α represents an angle between a center-to-center segment c and a segment b between the center of the first member and the center of the tip end, and β represents an angle between the center-to-center segment c and a segment a between the center of the second member and the center of the tip end, $$a=r2+e \quad (1),$$

$$b=r1+e \quad (2),$$

$$c=r1+r2+d3 \quad (3),$$

$$c=b\cdot\cos\alpha+a\cdot\cos\beta, \text{ and}$$

$$Y=b\cdot\sin\alpha=a\cdot\sin\beta;$$

dividing both sides by ab gives $$\frac{Y}{ab} = \frac{\sin\alpha}{a} = \frac{\sin\beta}{b};$$

from the law of sines $$\frac{\sin\alpha}{a} = \frac{\sin\beta}{b} = \frac{\sin\gamma}{c},$$

there is obtained $$\frac{\sin\gamma}{c} = \frac{Y}{ab};$$

therefore, $$Y = \frac{ab}{c}\sin\gamma; \quad (4)$$

from the law of cosines $c^2=a^2+b^2-2ab\cdot\cos\gamma$, there is obtained $$\cos\gamma = \frac{(a^2+b^2-c^2)}{2ab}; \quad (5)$$

by assigning values (1) to (3) to Equation (5), there is obtained $$\cos\gamma \quad (5)';$$

since $\sin^2\theta+\cos^2\theta=1$, there is obtained $$\sin\gamma = \sqrt{(1-\cos^2\gamma)} \quad (6);$$

by assigning value (5)' to Equation (6), there is obtained $$\sin\gamma \quad (6)';$$

by assigning values (1) to (3) and (6)' to Equation (4), Y is obtained; and when Y is obtained, the clearance value d3 is determined from a predetermined relationship between Y and d3.

7. A valve clearance measuring and adjusting device for a cylinder head which includes a valve assembled to a cylinder head main body, a rocker arm which is connected at one end to an end of the valve, and a cam shaft which comes into contact with a cam shaft abutment portion of the rocker arm having an arcuate surface so as to open and close the valve, the rocker arm including an adjust screw for adjusting a valve clearance between the cam shaft and the cam shaft abutment portion, the device being characterized by comprising:

a pair of probes adapted to be brought into direct contact with the cam shaft and the cam shaft abutment portion, and having respective round tip ends slightly larger than the valve clearance;

moving means for moving the pair of probes to a position of the valve clearance;

drive means connected to the pair of probes and adapted to open and close the probes;

measuring means for measuring a center-to-center distance between the tip ends of the pair of probes;

calculating means for calculating an actual valve clearance value on the basis of a measured center-to-center distance between the tip ends;

a valve clearance adjusting unit which is provided such that it can move toward and away from the adjust screw, and which rotates the adjust screw in an arbitrary direction on the basis of the actual valve clearance value measured by the measuring means, to thereby adjust the actual valve clearance value to a desired valve clearance value.

8. A valve clearance measuring and adjusting device according to claim 7, wherein:
the pair of probes is held by an arch bracket, and
the moving means which can move vertically is connected to the bracket.

9. A valve clearance measuring and adjusting device according to claim 8, wherein the drive means comprises:
a linear motion guide held by the bracket and supporting the pair of probes in such a manner as to allow opening and closing of the pair of probes;
a tension spring held by the bracket, provided in parallel with the linear motion guide, and adapted to close the pair of probes; and
a slide mechanism held by the moving means and adapted to open the pair of probes.

10. A valve clearance measuring and adjusting device according to claim 9, wherein
the slide mechanism comprises an actuator provided unitarily with the moving means and adapted to provide vertically rectilinear driving, and a rectilinear cam connected to the actuator and having a taper surface formed at a tip end thereof; and
rollers are provided at facing inner side surfaces, respectively, of the pair of probes in such a manner as to be reliable along the taper surface of the rectilinear cam.

11. A valve clearance measuring and adjusting device according to claim 8, wherein:
the bracket has through holes extending therethrough in a vertical direction;
pins are inserted through the respective through holes via respective compression springs urging the bracket upward in the vertical direction;
the moving means which can move in the vertical direction are connected to projecting portions of the pins; and
the bracket is floatably supported by the pins.

12. A valve clearance measuring and adjusting device according to claim 7, wherein each of the tip ends assumes the form of a column having a substantially circular section, and peripheral surfaces of the substantially circular columns are brought into direct contact with the cam shaft and the cam shaft abutment portion.

13. A valve clearance measuring and adjusting device according to claim 7, wherein the valve clearance adjusting unit comprises a nut runner section which includes at least one nut runner for rotating the adjust screw in an arbitrary direction; and a first elevating section which is connected to the nut runner section and which elevates and lowers the nut runner section in relation to the adjust screw.

14. A valve clearance measuring and adjusting device according to claim 7, further comprising a slide apparatus for sliding the probes, the moving means, the drive means, the measuring means, and the valve clearance adjusting unit in the longitudinal direction of the cam shaft.

15. A valve clearance measuring and adjusting device according to claim 7, further comprising a tilt apparatus for tilting the probes, the moving means, the drive means, the measuring means, and the valve clearance adjusting unit about a predetermined point in a plane perpendicular to the longitudinal direction of the cam shaft.

16. A valve clearance measuring and adjusting device according to claim 7, the calculating means includes a control apparatus for controlling rotation of the adjust screw by the valve clearance adjusting unit.

* * * * *

UNITED STATES PATENT AND TRADEMARK OFFICE
CERTIFICATE OF CORRECTION

PATENT NO. : 8,316,699 B2
APPLICATION NO. : 13/062315
DATED : November 27, 2012
INVENTOR(S) : Sueoka et al.

It is certified that error appears in the above-identified patent and that said Letters Patent is hereby corrected as shown below:

In the Claims

Column 25, line 25 (claim 10, last line), "reliable" should read -- rollable --.

Signed and Sealed this
Fifteenth Day of October, 2013

Teresa Stanek Rea
*Deputy Director of the United States Patent and Trademark Office*